United States Patent [19]
Hassan et al.

[11] Patent Number: 5,689,562
[45] Date of Patent: Nov. 18, 1997

[54] METHOD FOR TRANSMITTING SUPERIMPOSED IMAGE DATA IN A RADIO FREQUENCY COMMUNICATION SYSTEM

[75] Inventors: Amer Hassan, Cary; David G. Matthews, Raleigh, both of N.C.

[73] Assignee: Ericsson, Inc., Research Triangle Park, N.C.

[21] Appl. No.: 682,044

[22] Filed: Jul. 16, 1996

[51] Int. Cl.[6] .................................................. H04L 9/00
[52] U.S. Cl. ..................... 380/9; 380/6; 380/7; 380/10; 380/18; 380/20; 380/49; 380/54; 348/24
[58] Field of Search .................................. 380/3, 4, 5, 6, 380/7, 8, 9, 10, 18, 20, 49, 50, 54, 59; 352/81, 97; 348/22, 23, 24, 25

[56] References Cited

U.S. PATENT DOCUMENTS

| | | | |
|---|---|---|---|
| 2,531,831 | 11/1950 | Smith | 348/25 |
| 3,114,797 | 12/1963 | Williams | 348/25 |
| 4,674,125 | 6/1987 | Carlson et al. | |
| 4,682,869 | 7/1987 | Itoh et al. | |
| 4,709,394 | 11/1987 | Bessler et al. | |
| 4,718,104 | 1/1988 | Anderson | |
| 4,931,954 | 6/1990 | Honda et al. | |
| 5,050,230 | 9/1991 | Jones et al. | |
| 5,119,081 | 6/1992 | Ikehira | |
| 5,153,936 | 10/1992 | Morris et al. | |
| 5,218,455 | 6/1993 | Kristy | |
| 5,247,586 | 9/1993 | Gobert et al. | 348/22 X |
| 5,262,958 | 11/1993 | Chui et al. | |
| 5,420,637 | 5/1995 | Zeevi | |
| 5,461,655 | 10/1995 | Vuylsteke et al. | |

Primary Examiner—Bernarr E. Gregory
Attorney, Agent, or Firm—Rhodes, Coats & Bennett, L.L.P.

[57] ABSTRACT

The present invention relates to a method for transmitting image data for superimposed images via wireless devices in a radio frequency communication system. The original image is transmitted via a communication channel to a receiving unit. The original image is then revised to form a revised image. The revised image is compared to the original image to determine the differences between the revised image and the original image. These differences comprise a difference image which is then transmitted to the receiving party. At the receiving end, the difference image is recombined with the previously-transmitted original image to reform the revised image. In a preferred embodiment, the original images and difference images are preferably decomposed and progressively transmitted to the receiving unit in response to image data requests from the receiving unit.

34 Claims, 16 Drawing Sheets

METHOD FOR TRANSMITTING SUPERIMPOSED IMAGE DATA IN A RADIO FREQUENCY COMMUNICATION SYSTEM

FIELD OF THE INVENTION

The present invention relates to wireless communication systems and more particularly to a method for transmitting multiresolution image data of superimposed images via wireless devices in a radio frequency communication system.

BACKGROUND OF THE INVENTION

Multimedia applications are becoming an integral part in the design of wireline communication systems. These applications focus on the transmission of images, data, and speech over the same communication channel. A particular concern in multimedia applications is the transmission of images. An image comprises a two-dimensional signal that represents the relative luminarices of objects in a scene. A scene may comprise, for example, a photograph, a video image, an X-ray image, or a radar image for a weather forecast. Two important parameters are the quality and the intelligibility of the image resulting from the transmission of the image data.

A typical image consists of a matrix of 512×512 pixels. For uncolored images, each pixel is described by a gray level and uses 8 bits of memory to store this information. The result is that the entire image occupies approximately 2 Mbits of memory. For a colored image, each pixel uses 24 bits and results in a image occupying approximately 6 Mbits of memory. Thus, a full-detail color image usually requires a lot of memory, bandwidth, and power consumption.

As a natural result of advances in technology, attention is being given to the transmission of multimedia signals via radio frequency communication. In the near future, this communication vehicle will become an important part of the service requirements for radio frequency communication systems. However, unlike wireline communication systems, radio frequency systems tend to be spectrally limited. In addition, service costs, in terms of air time charges, are significantly higher for the consumer. Images usually occupy large quantities of device memory and the transmission of image signals take a correspondingly long time. As such, it becomes quite expensive to transmit images via radio frequency systems such as mobile cellular radio networks. These resources need not be wasted if high resolution image transmission is not required. The same requirement applies if the originally transmitted image is revised and must be retransmitted. Therefore, a system is needed whereby the air time necessary to transmit images via radio frequency systems can be minimized in order to minimize costs to the user.

SUMMARY OF THE INVENTION

The present invention relates to a method for transmitting multiresolution image data of superimposed images via wireless devices in a radio frequency communication system.

The superimposed image method is used in a communication system where an original image may be revised after it has already been transmitted. Revisions are essentially changes superimposed on top of the original image, which together form a revised image. Since the original image has already been transmitted, it is more efficient to transmit only the revised portion(s) of the original image to the receiving party. Thus, for a revised image, the image transmitting unit determines the differences between the original image and the revised image and transmits only the differences as a difference image. The difference image comprises only the revisions which were superimposed on the original image.

When the difference image is transmitted, the image receiving unit superimposes the difference image on top of the previously-received original image. By combining the data of the two superimposed images, the same revised image input at the image transmitting unit is then reformed. For example, an original image could comprise a handwritten note. After the note is transmitted to the receiving party, it is revised by the addition of a signature. Here, the difference between the two images is the signature which would form the difference image. Instead of transmitting the entire signed note, only the signature is transmitted. Once the signature is transmitted, it is then recombined with the unsigned note to form the signed note (the revised image). Therefore, the superimposed image method results in significant conservation of resources such as bandwidth, memory, power consumption and air time since transmission of redundant image data is eliminated.

However, the efficiency of the superimposed image method can be further increased by combining its use with that of a multiresolution image system. A multiresolution system uses wavelet techniques to decompose an image and store the image as discrete information blocks in the image transmitting unit. The information blocks include a base image, representing the lowest resolution of the image, and one or more image details which, when added to the base image, provide increasing levels of resolution. The maximum number of levels of resolution into which the image is decomposed may be determined by the resolution limits of the image transmitting unit or by artificial limitation on the image transmitting unit by the transmitting party.

After establishing a communication channel, the base image is transmitted to the image receiving unit. The base image is the lowest level of resolution for either an original image or a difference image. The image receiving unit includes means for incrementing the resolution of the base image by sending image data requests to the image transmitting unit. Additional image details are then transmitted to the image receiving unit. The additional image details received by the image receiving unit are then combined with the base image, again using wavelet techniques, to create a detail image of higher resolution. The image receiving unit may send multiple requests for additional image details. Each time, the additional image detail is combined with the previous image to provide a new detail image of higher resolution.

One advantage to decomposing the image into incremental levels of resolution is that only the level of resolution necessary to provide the agreed quality and intelligibility of the image is transmitted. For example, images such as handwritten notes may only require an intermediate or low level of image resolution to be intelligible. Bandwidth, power and transmission time are saved by transmitting a lower resolution. Images such as signatures or fingerprints may require high resolution to be effective for the purposes of the party receiving the communication. In such cases, the receiving party can request higher levels of resolution.

When the superimposed image system is combined with the multiresolution image system, the result is that the resolution of each transmitted image may be customized to meet the needs of the receiving party. Thus, to continue the above example, the original handwritten note may be transmitted and reformed at the image receiving unit at an acceptable resolution using the multiresolution image system. The note is then revised by the addition of the signature. Since the difference image in the superimposed image system comprises the signature and is transmitted in the same manner as the original image, the signature would also be subject to multiresolution transmission. Here, the signature would likely be desired at a higher resolution than the note itself. As such, the user of the image receiving unit could request more additional image details over the base image for the signature than were requested for the original note. Therefore, the original image (the note) could then be combined with the difference image (the signature) at different resolutions to form a customized version of the revised image.

By the use of the multiresolution image data system for superimposed images, the required level of resolution of each image or each component of an image can be determined by either party to the communication or the by the resolution limits of the communication devices. Representative applications of this concept include transmission of images from hand-held cellular radio devices or from laptop computers connected via an interface to a hand-held cellular radio devices.

Therefore, it can be seen that the main advantage of this method will be to minimize air time, bandwidth, power consumption, and other critical factors associated with radio frequency communication while allowing the users of the devices to determine the optimal resolution level of images necessary to suit their needs.

DETAILED DESCRIPTION OF THE INVENTION

Figure 1:
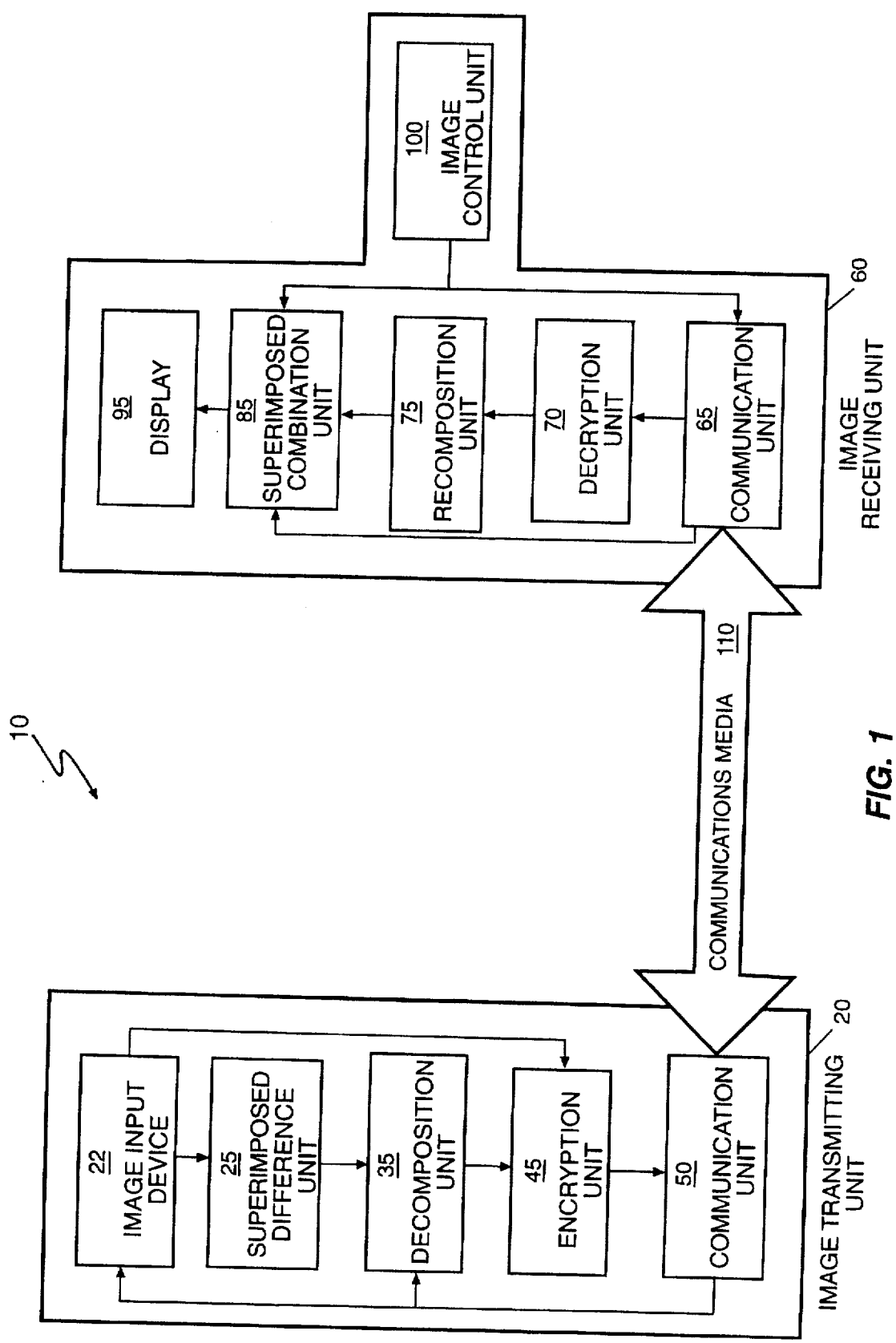
FIG. 1 is a general block diagram of the system configuration necessary for the implementation of the methodology of the present invention comprising an image transmitting unit for transmitting an image to an image receiving unit via a communications media.

Referring now to the drawings, FIG. 1 shows the basic embodiment of the multiresolution superimposed image data transmission system of the present invention, indicated generally by the numeral 10. The superimposed image transmission system of the present invention is particularly adapted for the transmission of a sequence of related images. More specifically, the superimposed image system allows the transmission of the original image and subsequent altered versions of the original image.

The original image is first transmitted in its entirety to a receiving unit. When the original image is subsequently altered, the new iteration of that image is compared to the previously-transmitted image to obtain the differences. The differences between the new iteration and the previously-transmitted image are then transmitted to the receiving unit. Because only the differences between the images are transmitted, this process greatly reduces the amount of data which needs to be transmitted, thereby utilizing the available bandwidth more efficiently, reducing the transmission time, and decreasing the cost of transmission.

Further optimization in image transmission is obtained by combining a multiresolution image transmission system with the superimposed image transmission system of the present invention. The multiresolution image system allows for independent control over the resolution of each image transmitted to the receiving unit. This includes the original image as well as any differences between a new iteration and the previously-transmitted image.

Using the multiresolution capability, an image is broken down or decomposed into a base image (which can be visualized as a grainy photograph) and a number of image details. If the image details are sequentially added to the grainy photograph, the photograph becomes increasingly clearer. When all of the image details are added to the base image, the original photograph is reconstructed. As such, if an image is decomposed prior to being transmitted to the receiving unit, the transmission of the image could start with a base image being sent to the receiving unit. The user of the receiving unit could then request additional details which would be transmitted and added to the base image. Thus, when the user of the receiving unit reaches a point where the resolution of the image is suitable for the purpose, no additional details will need to be requested.

With the multiresolution image system, the full detailed image may not be needed nor transmitted. Accordingly, this process can greatly reduce the amount of data which is transmitted for each image. Since this process can be applied to the original image as well as any differences between a new iteration and the previously-transmitted image of the superimposed image system, the available bandwidth is further utilized with more efficiency, the transmission time is further reduced, and the cost of transmission further decreased.

Note that the user of the image transmitting unit 20 may be able to designate specific image receiving units 60 which would be able to receive multiresolution image data. In practice, an example of this imposed limitation in a radio-telephone communication system would be where the user of the image transmitting unit 20 programs certain authorized telephone numbers into the device. As a result, only callers from those specific telephone numbers with image receiving units 60 would have full multiresolution image data reception capability. Callers from numbers other than those specifically authorized by the user of the image transmitting unit 20 would receive either no image data or image data at a preset level of resolution. Thus, the blocking of all image data transmission would comprise a security feature to prevent reception of images by unauthorized parties. The transmission of only the marginally usable base image to unauthorized numbers may also have a similar security effect. However, transmission of any higher level of resolution, such as the base image combined with a number of image details, may be set by the user of the image transmitting unit 20 in order to limit air time required for transmission. The user of the image transmitting unit 20 may determine that an intermediate level of resolution is all that the receiving party needs and would transmit only that level. Therefore, this option will also assist both in the security and in the optimization of bandwidth, power and transmission time parameters of image transmission.

FIG. 1 shows the basic elements of the multiresolution superimposed image data transmission system 10. The basic elements include an image transmitting unit, generally numbered as 20, an image receiving unit generally numbered as 60, and a communications media 110 providing a communications link between the image transmitting unit 20 and the image receiving unit 60. In its simplest form, an image transmitting unit 20 takes an image into the system and manipulates it before transmitting the image to an image receiving unit 60 via the communications media 110. Here, "manipulation" of the image refers to the application of either or both the superimposed image system and the multiresolution image system. The image receiving unit 60 then undoes the manipulations that were performed by the image transmitting unit 20 on the image and displays it to the party receiving the image.

The image transmitting unit 20 comprises an image input device 22, a superimposed difference unit 25, a decomposition unit 35, an encryption unit 45, and a communication unit 60. The purpose of the image input device 22 is to input images into the system. The image input device 22 sends its output to the superimposed difference unit 25. The superimposed difference unit 25 compares the image to the previous image, if any, and generates a difference image containing only the revisions to the previous image. The decomposition unit 35 receives the output of the superimposed difference unit 25 and decomposes the image for progressive transmission. The encryption unit 45 encrypts the image data prior to transmission. The communication unit 50 provides a two-way communications interface with the image receiving unit 60. The communication unit 50 transmits image data to the image receiving unit 60 and receives image data requests and other control signals from the image receiving unit 60.

The image receiving unit 60 comprises a communication unit 65, a decryption unit 70, a recomposition unit 75, a superimposed combination unit 85, a display 95, and an image control unit 100. The communication unit 65 allows the reception of image data from the image transmitting unit 20 and the transmission of image data requests and other control signals to the image transmitting unit 20. If the image is encrypted, the decryption unit 70 decrypts the image data before passing the data to the recomposition unit 75. The recomposition unit 75 recomposes images which have been decomposed prior to transmission. The superimposed combination unit 85 adds the difference images to the previous image to recreate revised images at the image receiving unit 60. The images are displayed on the display 95.

The communications media 110 illustrated in FIG. 1 comprises the means by which the image transmitting unit 20 communicates with the image receiving unit 60. While the means of communication is not unique to the present invention, it may comprise such methods as wireline, radio frequency, infrared, or microwave. Subclasses to the means of communication may be any channels which are dedicated for specific roles in the communication between the image transmitting unit 20 and the image receiving unit 60. In the present invention, a radio frequency means of communication is assumed.

Figure 2:
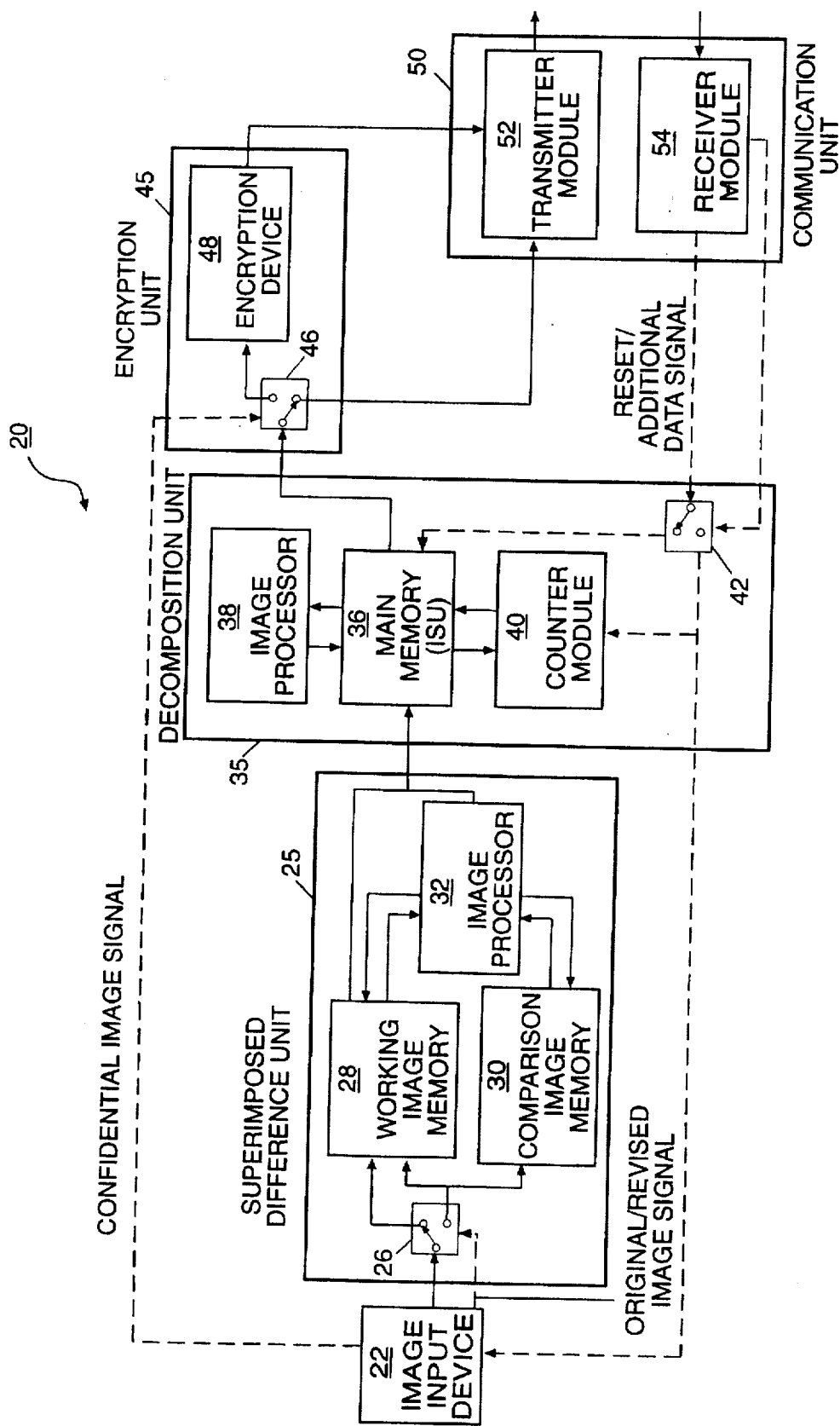
FIG. 2 is a block diagram of the image transmitting unit of the system and methodology embodied by the present invention illustrating the interactions between the basic components of the unit.

Referring now to FIG. 2, the image transmitting unit 20 is shown in greater detail. An image input device 22 is used to input images into the system and may include, for example, a disk reader, a scanner, a whiteboard (with scanner), or an electronic drawing pad. Once an image is input into the system, it is manipulated by the superimposed difference unit 25. The superimposed difference unit 25 determines the differences between two successive images in a revision sequence and forms an image containing only the revisions, or a difference image. New or original images are not manipulated by the superimposed difference unit 25. The purpose of producing a difference image is to avoid transmitting an entire revised image when a previous similar image has already been transmitted. Thus, if only a difference image were transmitted, it could then be recombined with the previously-transmitted image at the image receiving unit 60 to reform the revised image.

The superimposed difference unit 25 comprises a data routing switch 26, a working image memory 28, a comparison image memory 30, and an image processor 32. The data routing switch 26 routes images from the image input device 22 to the working image memory 28 and the comparison image memory 30. Original, unrevised images are routed to the whole image memory 28 and the comparison image memory 30 is cleared. Revised images are only routed to the whole image memory 28. The image processor 32 compares the image in the whole image memory 28 with the image in the comparison image memory and extracts the differences to create a difference image.

The image from the superimposed difference unit 25, whether an original image or a difference image, then continues through the system to the decomposition unit 35. The purpose of the decomposition unit 35 is to break the image down into a base image and one or more image details. This decomposition process is the basis of the multiresolution aspect of the present invention. The coarsest resolution of the image (the base image) would be the initial image transmitted. The receiving party would then be able to request additional image details to enhance the resolution of the base image.

The decomposition unit 35 includes a main memory (ISU) 36, an image processor 38, a counter module 40, and a routing switch 42. The main memory (ISU) 36 stores the image sent by the superimposed difference unit 25. The image processor 38 decomposes the image into discrete information blocks including a base image and one or more detail images. The information blocks are then stored in the main memory (ISU) 36. The counter module 40 is used to keep count of the number of information blocks, corresponding to a particular image, transmitted by the image transmitting unit 20. The routing switch 42 processes control signals from the image receiving unit 60 which may comprise image data requests or reset signals. Image data requests are directed to the main memory (ISU) 36, from where the corresponding information blocks are forwarded for transmission to the image receiving unit 60. Reset signals reset the counter module 40 and notify the image input device 22 that the image receiving unit 60 is ready to receive another image.

The encryption unit 45 comprises a routing switch 46 and an encryption device 48. If the content of the image is confidential or proprietary, the image can be encrypted. This prevents the use of the image by an unauthorized party if the image happens to be intercepted during communication. The user-indicated operating parameter supplied at the image input device 22 determines whether the image is encrypted. If the image is encrypted, an encryption code is included with the image data. However, if not encrypted, the image passes unaltered through the encryption unit 45 via the routing switch 46.

The communication unit 50 provides an interface to the communications media 110. The communication unit 50 includes a transmitter module 52 and a receiver module 54. The transmitter module 52 transmits the image data to the image receiving unit 60. The receiver module 54 receives the image data requests and other control signals from the image receiving unit 60.

Figure 3:
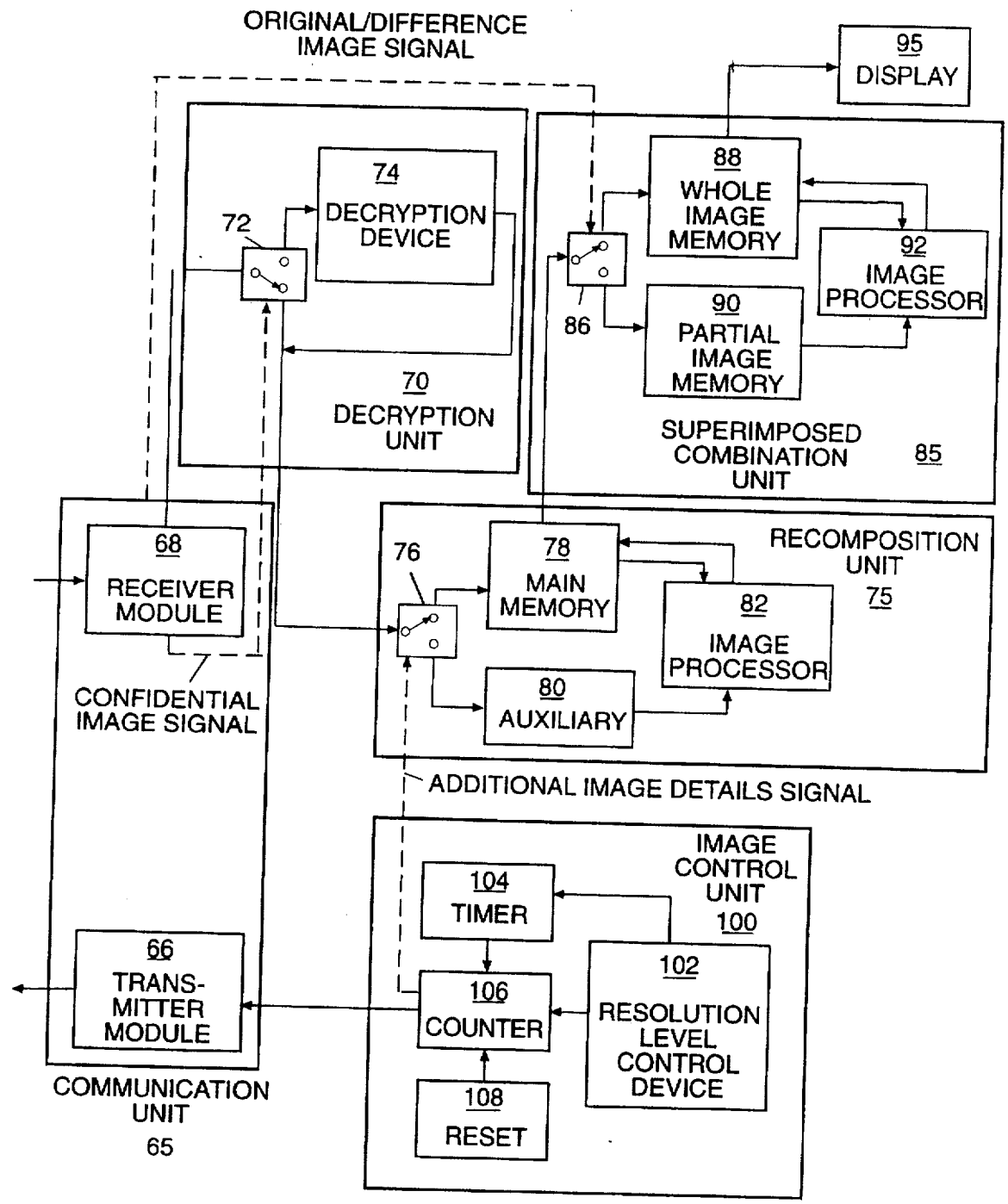
FIG. 3 is a block diagram of the image receiving unit of the system and methodology embodied by the present invention illustrating the interactions between the basic components of the unit.

Referring now to FIG. 3, the image receiving unit 60 is shown. The transmitted image data is received by the communication unit 65 of the image receiving unit 60. The communication unit 65 includes a receiver module 68 to receive transmitted images and a transmitter module 66 for sending image data requests or other control signals, such as a reset signal, to the image transmitting unit 20.

Once the image data is received by the receiver module 68, it is directed to the decryption unit 70 where it must be determined if the data is encrypted by searching for an encryption code in the image data. The decryption unit 70 includes a decryption device 74, which decrypts encrypted data, and a routing switch 72. If an encryption code is present, the image data is directed to the decryption device 74 where it is decrypted. However, if the image is not encrypted, the image is routed by the switch 72 directly to the recomposition unit 75.

The purpose of the recomposition unit 75 is to recompose images transmitted by the image transmitting unit 20. The recomposition unit 75 includes a routing switch 76, a main memory (IDU) 78, an auxiliary memory 80, and an image processor 82. The switch 76 directs received image data to the main memory (IDU) 78 or the auxiliary memory 80. In general, the base image is directed to the main memory (IDU) 78 and any additional image details are directed to the auxiliary memory 80. The image processor 82 combines the image details stored in the auxiliary memory 80 with the image stored in the main memory (IDU) 78. The resulting detail image is then stored in the main memory (IDU) 78 and may replace the image previously stored there. Thus, the image details build higher resolution atop the previous image. The resulting image is then directed to the superimposed combination unit 85.

The superimposed combination unit 85 includes a routing switch 86, a whole image memory 88, a partial image memory 90, and an image processor 92. The switch 86 routes the images from the recomposition unit 75 to either the whole image memory 88 or the partial image memory 90. Generally, original images are directed to the whole image memory 88 whereas difference images are directed to the partial image memory 90. The image processor 92 combines the difference image in the partial image memory 92 with the whole image in the whole image memory 88 to recreate a revised image. The revised image is stored in the whole image memory 88 and may replace the image previously stored there.

The image control unit 100 serves to control the transmission of images from the image transmitting unit 20. The image control unit 100 includes a resolution level control device 102, a timer 104, a counter module 106, and a reset device 108. The resolution control device 102 is used to increment the resolution of the images received from the image transmission unit 20. The resolution control device 102 may comprise, for example, a simple push-button. Pressing the button 102 causes the transmitter module 66 to send an image data request to the image transmitting unit 20. The counter module 106 keeps a count of the number of image data requests sent. The timer 104 is used to delay the transmission of the image data request so that multiple presses of the button 102 can be accumulated and sent as a single request. The reset device 108 resets the counter module 106 and sends a reset signal via the transmitter module 66 to the image transmitting unit 20.

The image control unit 100 starts the image transmission process by sending an image data request to the image transmitting unit 20. The first data request signal usually results in the base image being transmitted by the image transmitting unit 20. After viewing of the image by the receiving party, subsequent image data requests result in additional image details being transmitted to the image receiving unit 60 to be combined with the previous image. When the receiving party is satisfied with the resolution of the transmitted image, a reset device 108 is activated.

Activation of the reset device 108 generates and sends a reset signal to the image transmitting unit 20. The reset signal indicates that the image receiving unit 60 is ready to receive another image. The reset signal serves a second purpose in that it signals the image transmitting unit 20 that the user of the image receiving unit 60 is satisfied with the previously-transmitted image. Thus, in general, it is the receiving party which controls the transmission of image data.

OPERATION

Figure 4A:
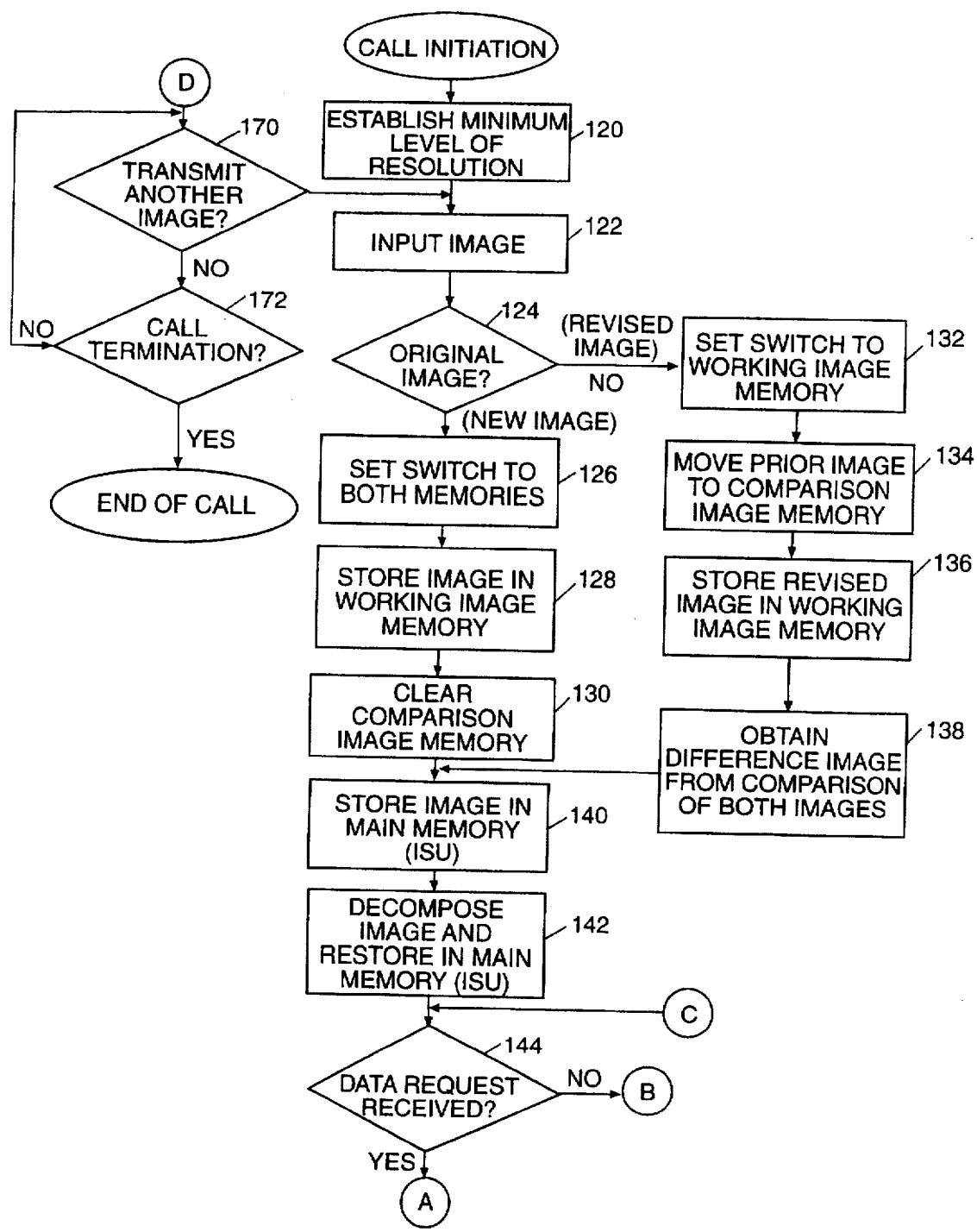
FIG. 4 is a flow diagram illustrating the operation of the image transmitting unit of the present invention.
Figure 4B:
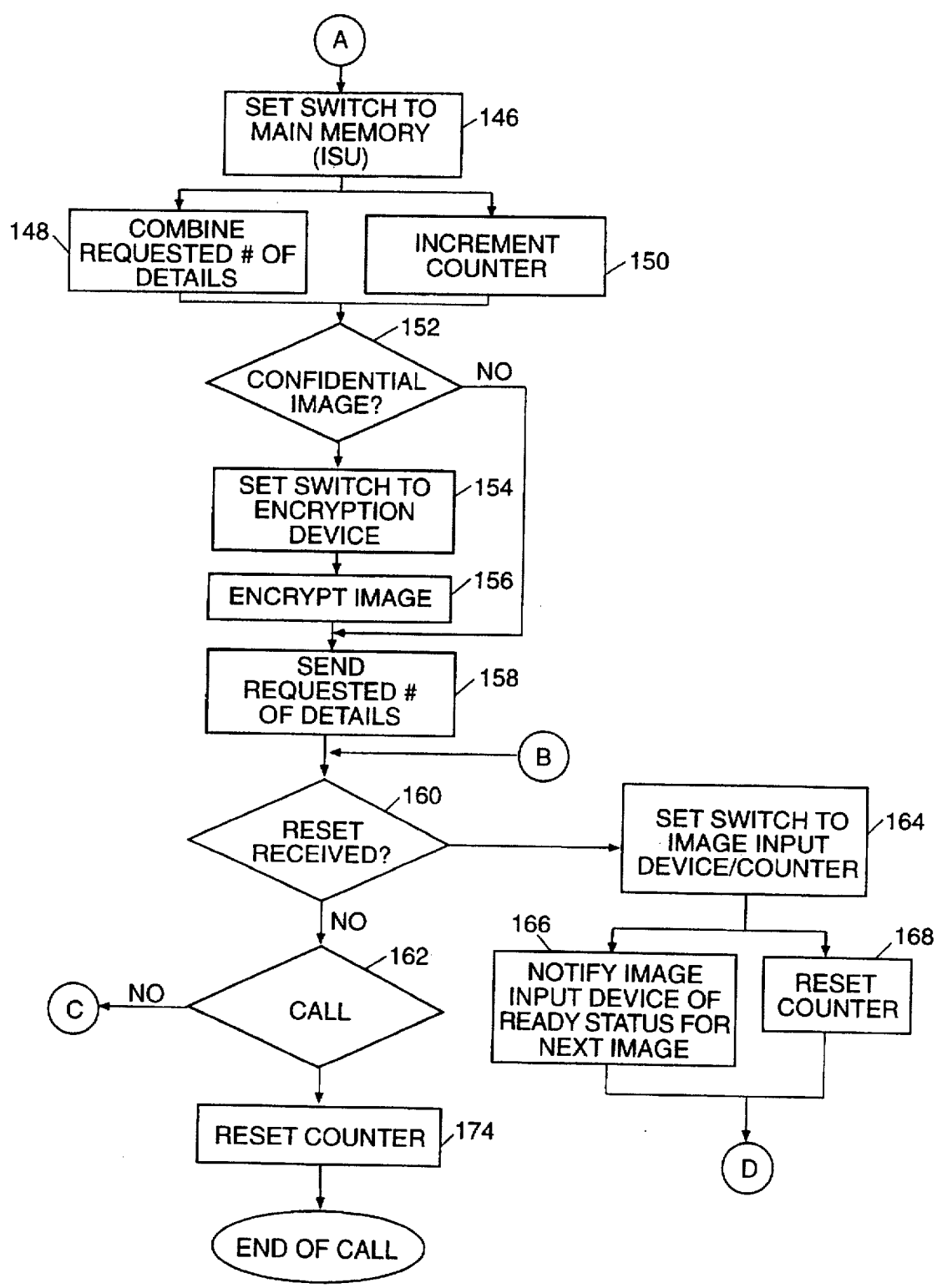
Figure 5A:
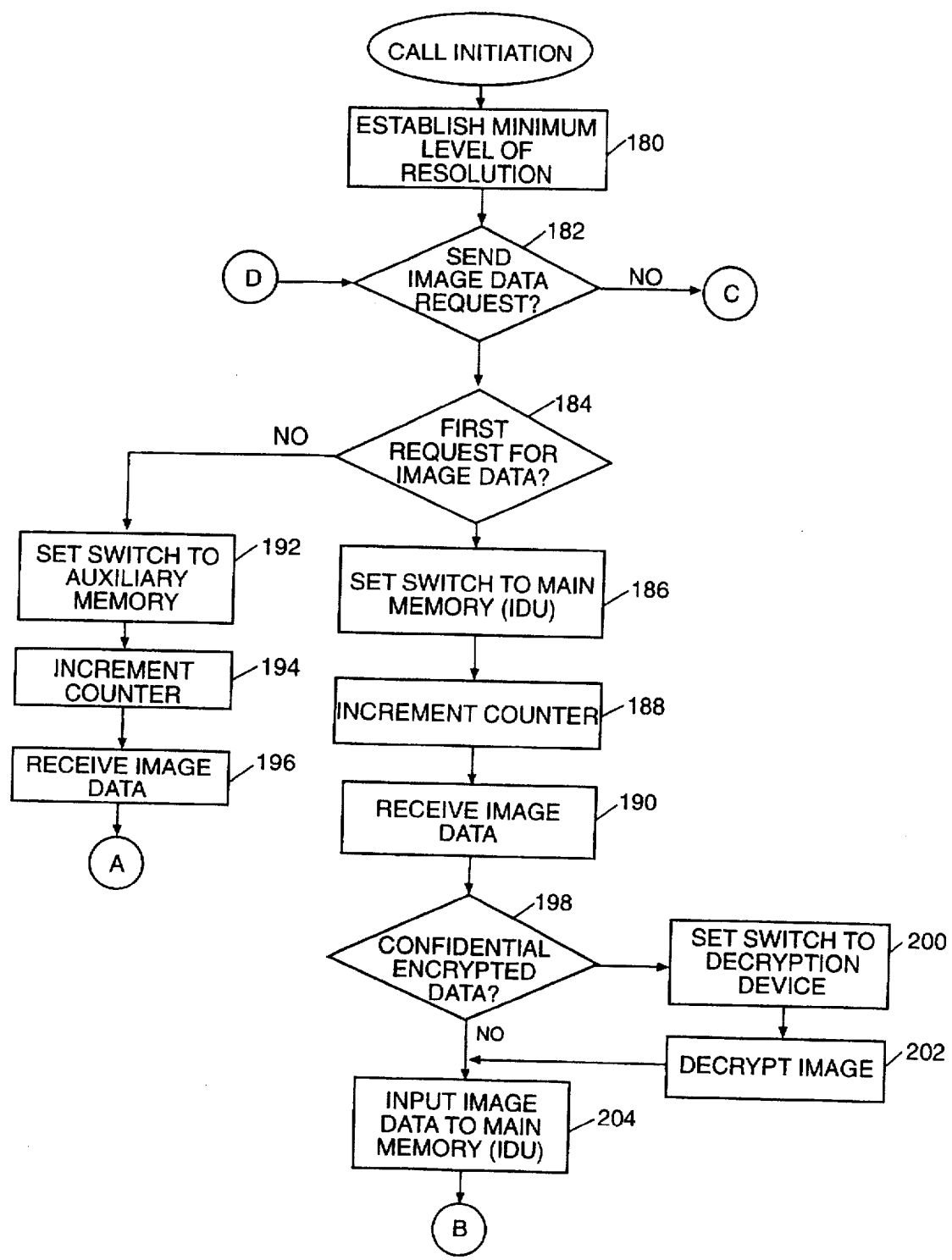
FIG. 5 is a flow diagram illustrating the operation of the image receiving unit of the present invention.
Figure 5B:
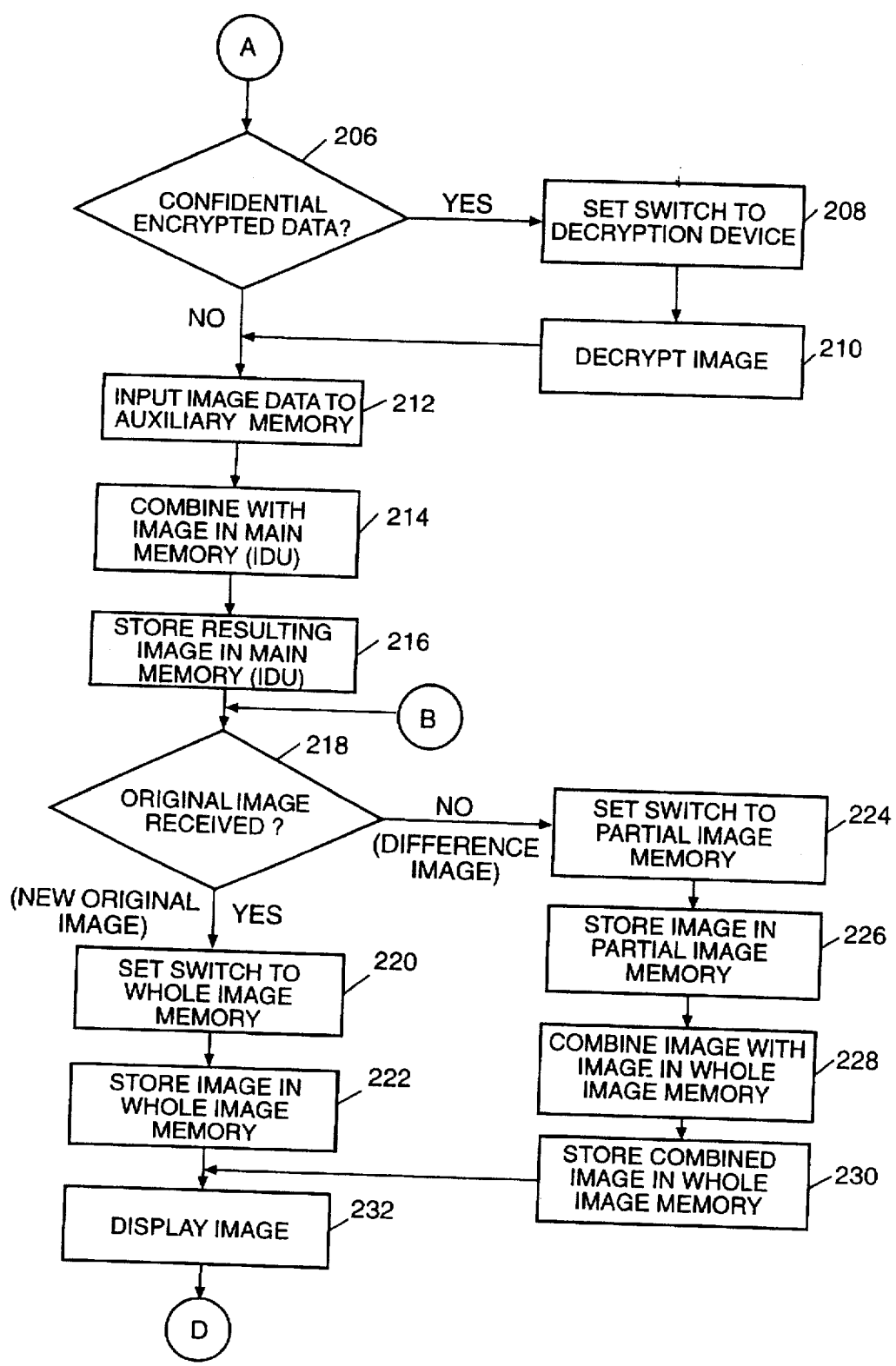

The operation of the image transmitting unit 20 and the image receiving unit 60 is illustrated by FIGS. 4 and 5, respectively. The first step in the initiation of a communication is to establish the minimum level of resolution as shown in function block 120 (FIG. 4) for the transmitting party and function block 180 (FIG. 5) for the receiving party. This parameter is used to progressively transmit multiresolution image data as will be further described below. Typically, the minimum initial level of resolution is preset in both the image transmitting unit 20 and the image receiving unit 60 by the respective user. If the level specified by each party is different, the minimum of the two values is the limiting initial parameter.

Note that, in addition to setting a minimum level of resolution, the transmitting party may also be able to specify the maximum level of resolution available to the receiving party. The maximum level of resolution set by the transmitting party may be less than the resolution of the original image when initially input into the system. For instance, the image may have originally been decomposed into a base image and seven additional image details. The transmitting party could limit the maximum available resolution to four additional image details. Accordingly, the receiving party would only be able to receive a maximum resolution of the base image with four additional image details, not the full resolution of the original image. This feature is useful where the transmitting party bears the cost of the communication and seeks to limit the air time required for the image transmission.

After the minimum level of resolution has been established the image to be transmitted is input to the image transmission unit (function block 122). At the time that an image is input into the system, other necessary operating parameters are also determined. These operating parameters may include, for example, whether the image is an original image or a revision to a previous image and whether the image is confidential. Defined parameters may be used to generate control signals for the system or may be coded with the image data.

The image transmission unit 20 determines whether the image is an original or a revision of a previous image (decision block 124). If the image is an original, unrevised image, the routing switch 26 is set to both the working image memory 28 and the comparison image memory 30 (function block 126). The image is stored in the working image memory 28 (function block 128) and the comparison image memory 30 is cleared (function block 130). From here, the original image is sent to the decomposition unit 35 where it is stored in the main memory 36 (function block 140).

If the operating parameter indicates that the image is a revised image (decision block 124), or in other words a revision to an original image, the routing switch 26 is set to working image memory 28 only (function block 132). However, before storing the revised image in the working image memory 28, the previous image stored in the working image memory 28 is first transferred to the comparison image memory 30 through the image processor 32 (function block 134). Once the transfer is completed, the revised image is stored in the working image memory 28 (function block 136). The image processor 32 then determines the differences between the revised image and the previous image to form a difference image (function block 138). The difference image is subsequently sent to the image decomposition unit 35 where it is stored in the main memory (ISU) 36 (function block 140).

After the image is stored in the main memory (ISU) 36 of the decomposition unit 35, the image is then decomposed by the image processor 38 into discrete information blocks which are stored again in the main memory (ISU) 36 (function block 142). The image may be decomposed, for example, by using wavelet techniques or other pyramidal image decomposition schemes. Such methods are well-known to those skilled in the art and therefore are not described herein. Briefly, the original image S is decomposed into a base image $S_0$ and a series of image details $D_1$, $D_2, \ldots D_n$. Both the base image $S_0$ and the image details $D_1$, $D_2, \ldots D_n$ are stored in the main memory (ISU) 36 of the decomposition unit 35. The image details $D_1, D_2, \ldots D_n$ can be recombined with the base image $S_0$ to provide detail images. For example, $S_0$ combined with $D_1$ would provide a detail image of one resolution level above the base image. Similarly, $S_0$ combined with $D_1$ and $D_2$ would provide a detail image of two resolution levels above the base image. Following this concept, $S_0$ combined with $D_1, D_2, \ldots$ and $D_n$ would provide a detail image with the highest available level of resolution corresponding to the maximum original level of decomposition. For a more detailed explanation of wavelet techniques, see S. G. Mallat, *A Theory for Multiresolution Signal Decomposition: The Wavelet Representation*, IEEE Transactions on Pattern Analysis and Machine Intelligence, vol. 11, no. 7, pp. 674–693 (July, 1989), which is incorporated herein by reference.

The actual image transmission is initiated by an image data request from the image receiving unit 60. When an image data request is received by the image transmitting unit 20 (decision block 144), the image transmission unit 20 begins transmitting the image. Usually, both the image data requests and reset signals can be transmitted via a dedicated control channel DCC such as the fast associated control channel (FACCH) or the slow associated control channel (SACCH). Note that a dedicated control channel DCC may be utilized for signal transmission since no image data is sent. An additional factor which would require such a dedicated control channel DCC is if a conversation was also in progress during the transmission of the imaging sequence.

When an image data request is received by the image transmitting unit 20 (decision block 144), the routing switch 42 is set to main memory (ISU) 36 (function block 146). As generally indicated by function block 148, the image data request is then processed and the requested data readied for transmission to the image display unit 60. When the first image data request is received, the main memory (ISU) 36 usually forwards an information block containing the base image. For subsequent image data requests, the main memory (ISU) 36 prepares an information block containing the next level of image detail in response to each image data request. If a request for multiple information blocks is received, the main memory (ISU) 36 either combines the multiple details into a single information block or combines the requested number of blocks in a sequential string corresponding to the increasing level of detail over the base image (function block 148). As indicated by function block 150, each time a request for image data is received, the counter module 40 increments the count to ensure that the number of information blocks does not exceed the maximum levels of detail available for that image. In practice, the image transmitting unit 20 may also be able to transmit additional image details without first receiving an image data request from the image receiving unit 60. This would be accomplished through a separate resolution control device incorporated into the image transmitting unit 20. In such instances, the user of the image transmitting unit 20 could transmit additional image details in response to a verbal request from the user of the image receiving unit 60. Control codes in the image data would then notify the image receiving unit 60 of the nature of the incoming data.

If the data is confidential, image encryption then occurs prior to transmission. The image transmission unit 20 determines, prior to transmission of the image data, whether the image is confidential (function block 152). If so, the routing switch 46 is set to the encryption device 48 and the data is encrypted (function blocks 154, 156). Confidential images may include, for example, signatures, proprietary plans, or sensitive data which the sender does not want to be intercepted and used by parties external to the immediate conversation. If the image is not confidential, the routing switch 46 is set to bypass the encryption device 48 (the default mode). Either way, the image data is sent to the transmitter module 52 for transmission to the image receiving unit 60 (function block 158).

The image is progressively transmitted as discrete information blocks to the image receiving unit 60. When an image data request is received from the image receiving unit 60, the image transmission unit 20 responds by sending the requested level of image data. Usually, only the base image is transmitted in response to the initial image data request. This image is most often an order of magnitude smaller than the original image. The initial image, however, may also comprise the base image and one or more image details. In such case, the base image and the details are combined at the image transmission unit 20 prior to transmission.

If more detail is required, the recipient can send additional image data requests (in real time) for more details. For each additional image data request, the image transmission unit 20 responds by sending an information block containing the next level of image detail. The counter module 40 is updated at the time of each transmission to maintain count of the number of transmitted information blocks (function block 150). At the image receiving unit 60, the image details are recombined with the base image and any previous image details received to improve the resolution of the image. If a request for multiple image details is received by the image transmission unit 20, the corresponding number of information blocks containing the next levels of image detail are transmitted sequentially to the image receiving unit 60 before being recombined with the previous image to further increase the resolution (function block 148).

The transmission of an image continues until either the last information block is sent or until a reset signal is received from the image receiving unit 60. The image transmitting unit 20 determines, at function block 160, whether a reset signal has been received. If a reset signal is not received from the image receiving unit 60 or the call is not terminated, the main memory (ISU) 36 will continue to process image data requests from the image receiving unit 60 until the maximum level of resolution is reached. However, if a reset signal is received, the routing switch 42 is set to the image input device 22/counter module 40 as indicated in function block 164. As a result, the image input device 22 is notified that the image receiving unit 60 is ready to receive the next image (function block 166) and the counter module 40 is reset (function block 168). Receipt of a reset signal is also an indicator to the image transmitting unit 20 that the resolution of the previous image is acceptable to the user of the image receiving unit 60. If another image is to be sent (decision block 170), the process then restarts with the image input at function block 122.

If no other images are to be transmitted, either the call is terminated and the communication ended or the system waits to see if the user may decide to send another image (decision block 172). Note that if a reset signal is not received in decision block 160, but the call is terminated (decision block 162), the counter module 40 is reset (function block 174) prior to the end of the call.

Referring now to FIG. 5, the operation of the image receiving unit 60 will be examined in greater detail. As described in the previous section, the image transmission process starts with the transmission of an image data request from the image receiving unit 60 to the image transmitting unit 20 (decision block 182). This is accomplished by activating the resolution level control device 102 which may comprise, for example, a push-button which is pressed by the receiving party. Pressing the button 102 for the first time is termed the initial image data request. When an initial image data request is sent by the receiving unit 60 (decision block 184), the routing switch 76 in the recomposition unit 75 is set to direct the incoming data into the main memory (IDU) 78 (function block 186). In essence, the minimum resolution image, or base image, is being requested by the image receiving unit 60.

When additional image details are requested by further presses of the button 102 (decision block 184), the routing switch 76 is generally set to auxiliary memory 80 (function block 192) before the subsequent image data request is transmitted. This notifies the recomposition unit 75 that the incoming image data will be added to the existing image which has already been received. In further detail, activation of the button 102 for additional image details actually leads to three events: the timer 104 is activated, a increment corresponding to the extent of activation of the button 102 is registered by the counter module 106 (function block 194), and the routing switch 76 is set to route the incoming additional details to the auxiliary memory 80 (function block 192). After the specified time-out, the timer 104 commands the counter module 106 to send an image data request to the image transmitting unit 20 corresponding to the increment registered by the counter module 106. For example, if the button 102 is pressed 2 times, a request for two information blocks is sent via the dedicated control channel DCC. Similarly, if the receiving party had activated the button 102 three times, the image transmitting unit 20 would be requested to transmit three information blocks containing additional image details. In either case, the counter module 106 is incremented to keep count of the number of information blocks requested (function blocks 188,194).

The requested image data is then received (function blocks 190,196) at the receiver module 68 of the communication unit 65. As discussed in the previous section, the data contains coded control information to direct certain processes in the image receiving unit 60. The image data will, for example, contain codes to indicate whether the image is an original image or a difference image. These codes will progress with the image data and affect its routing at the recomposition unit 75 and the decryption unit 70, respectively.

If the image was encrypted as a result of the sending party's instruction at the image input device 22, it will be indicated as such in a code included with the image data. If the data is encrypted (decision block 198 for the initial data request and decision block 206 for additional image details), the routing switch 72 is set to the decryption device 74 in order to decrypt the image (function blocks 200,208). The decryption device 74 has the capability of reversing the encryption algorithm of the image transmitting unit 20 and returning the data to its original unencrypted state (function blocks 202,210). If the image data is not encrypted, the routing switch 72 is set to allow the image data to bypass the decryption device 74. Either way, the image data is then directed toward the recomposition unit 75.

The recomposition unit 75 recombines images which have been decomposed prior to transmission. In operation, the initial or base image is directed to and stored in the main memory (IDU) 78 (function block 204) to serve as the image to which additional details will be added. Any additional image details requested and received are directed to and stored in the auxiliary memory 80 (function block 212). When image details are received, the contents of both the main memory/(IDU) 78 and the auxiliary memory 80 are combined by the image processor 82 into a single recomposed image (function block 214). The recomposed image, referred to herein as a detail image, comprises at least the base image, but may include the base image recombined with all available image details (the full resolution image). Thus, once recomposed, the detail image is stored in the main memory (IDU) 78 (function block 216) before being directed to the superimposed combination unit 85.

As previously described, transmission of difference images to be superimposed on the previously-transmitted image forms the desired revised image without having to transmit the entire revised image to the receiving party. Accordingly, depending on the nature of the image specified by the sending party, the routing switch 86 is set to direct the image from the recomposition unit 75 either to the whole image memory 88 or the partial image memory 90 (decision block 218). In general, original images are stored in the whole image memory 88 (function blocks 220,222) while difference images are stored in the partial image memory 90 (function blocks 224,226). If a difference image is stored in the partial image memory 90, the image processor 92 then combines the image in the whole image memory 88 with the image in the partial image memory 90 to reform the revised image (function block 228). The revised image, also called the resultant image, is stored in the whole image memory 88 (function block 230). After either an original image or a revised image has been stored in the whole image memory 88, the image is sent to the display 95 for viewing by the receiving party (function block 232).

It is important to note that the original image at its final accepted resolution is combined with the difference image at each iteration through the resolution control. Therefore, in accordance with this methodology, the final revised image displayed on the display 95 may comprise an original image and multiple difference images, all at different resolutions.

After the image is received, the image receiving unit 60 will remain in a quiescent state and wait for the user to either request additional details (decision block 182), reset (decision block 234), or terminate the call (decision block 236). If user opts to reset after an acceptable resolution has been obtained for an image, the image receiving unit 60 resets the counter module 106 and sends a reset signal to the image transmitting unit 20 (function blocks 238, 240). Note that a reset may also be effectuated by activation of the button 102 more times than the maximum number of details that could be simultaneously requested. Also, as previously stated, the transmission of a reset signal is also an indicator to the image transmitting unit 20 that the resolution of the previous image is acceptable to the user of the image receiving unit 60. From there, the process proceeds back to decision block 182 to await the decision of the user of the image receiving unit 60. If another image is to be received, the process restarts with the activation of the button 102 which sends an image data request.

If the call is terminated (decision block 236), the counter module 106 is reset (function block 242) and a final reset signal transmitted to the image transmitting unit 20 (function block 244) prior to the end of the call.

The superimposed image transmission system of the present invention may be used by itself or in conjunction with the multiresolution transmission system as described above. In other words, the superimposed image system can operate independently of the multiresolution image system. Thus, in its basic form and with the apparatus previously described, a superimposed image system takes in an original image through the image input device 22 of the image transmitting unit 20. The original image is then transmitted from the image transmitting unit 20 to the image receiving unit 60 where the entire original image is displayed on the display 95. By pressing the reset device 108, the image receiving unit 60 sends a signal to the image transmitting unit 20 that it is ready to receive a difference image. When a revised image is input into the image input unit 22, the image transmitting unit 20 determines the differences between the revised image and the original image and forms a difference image. This difference image is then transmitted to the image receiving unit 60 where it is recombined with the original image that was previously transmitted. Once the difference image and the original image are recombined, the resulting revised image is displayed on the display 95.

An example of this process would be where the sender inputs an unsigned handwritten note into the system through the image input unit 22 for transmission to the receiving party. The sender is seeking the approval of the receiving party regarding the content of the note. As such, the unsigned handwritten note is the original image in the procedure which is stored in the working image memory 28. The sender receives a verbal approval of the note from the receiving party. Sender then signs the handwritten note and again inputs it through the image input unit 22. The original image (the unsigned note) is first transferred to the comparison image memory 30 and then the revised image (the signed note) is stored in the working image memory 28. The image processor 32 then determines the differences between the original image and the revised image. In this example, the difference would be the addition of the sender's signature. Thus, the difference image formed by the image processor 32 would contain only the sender's signature. Since the note itself was already sent to the receiving party, that component of the revised image does not need to be transmitted again. Therefore, the intent of this process is to save image transmission time by transmitting only the signature and then recombining it with the note already received at the image receiving unit 60 to reform the revised image.

Figure 6A:
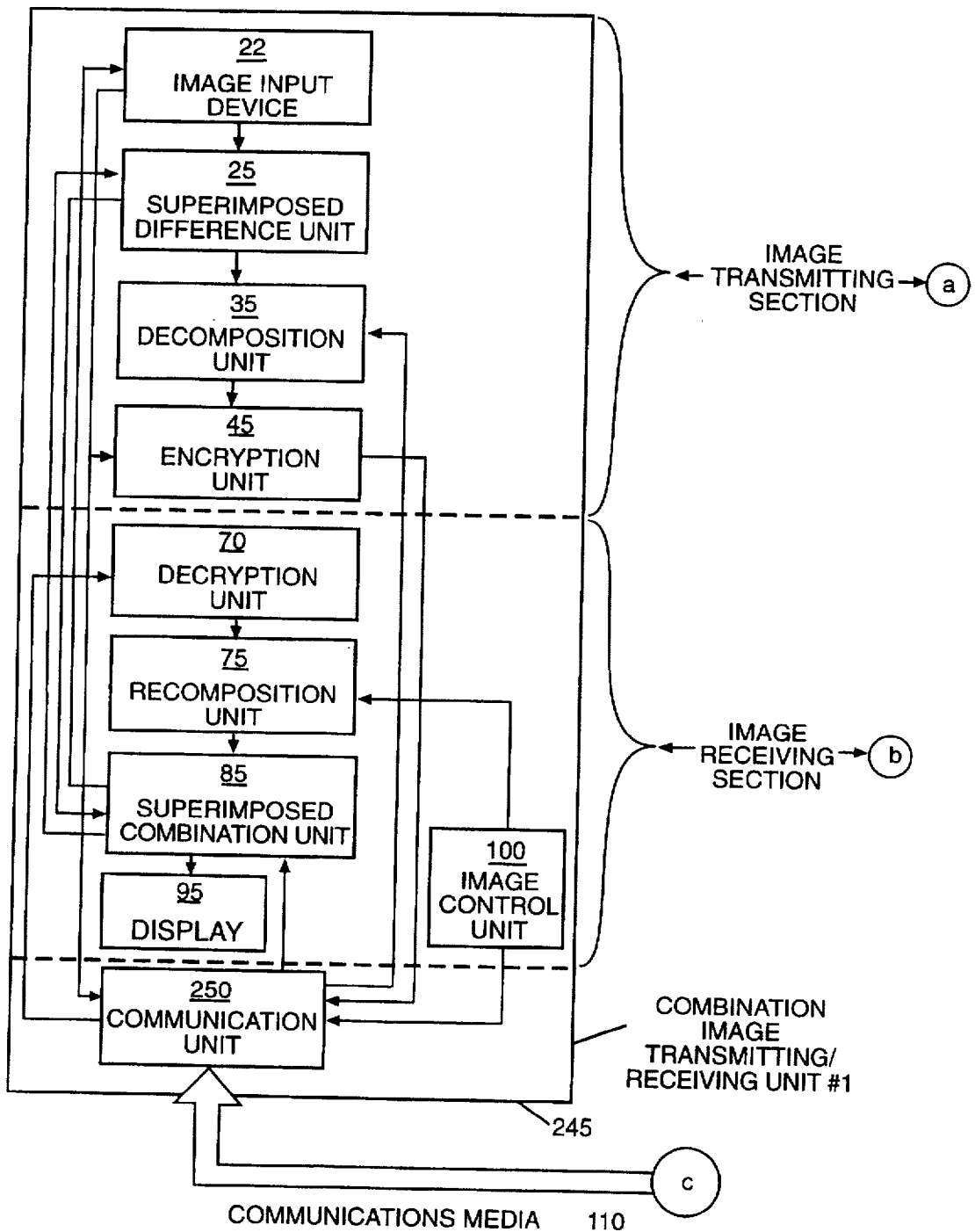
FIG. 6 is a general block diagram of the system configuration necessary for the implementation of the methodology of the present invention illustrating the combination of an image transmitting unit and an image receiving unit into one combination image transmitting/receiving unit whereby both parties to the communication are able to transmit and receive images.
Figure 6B:
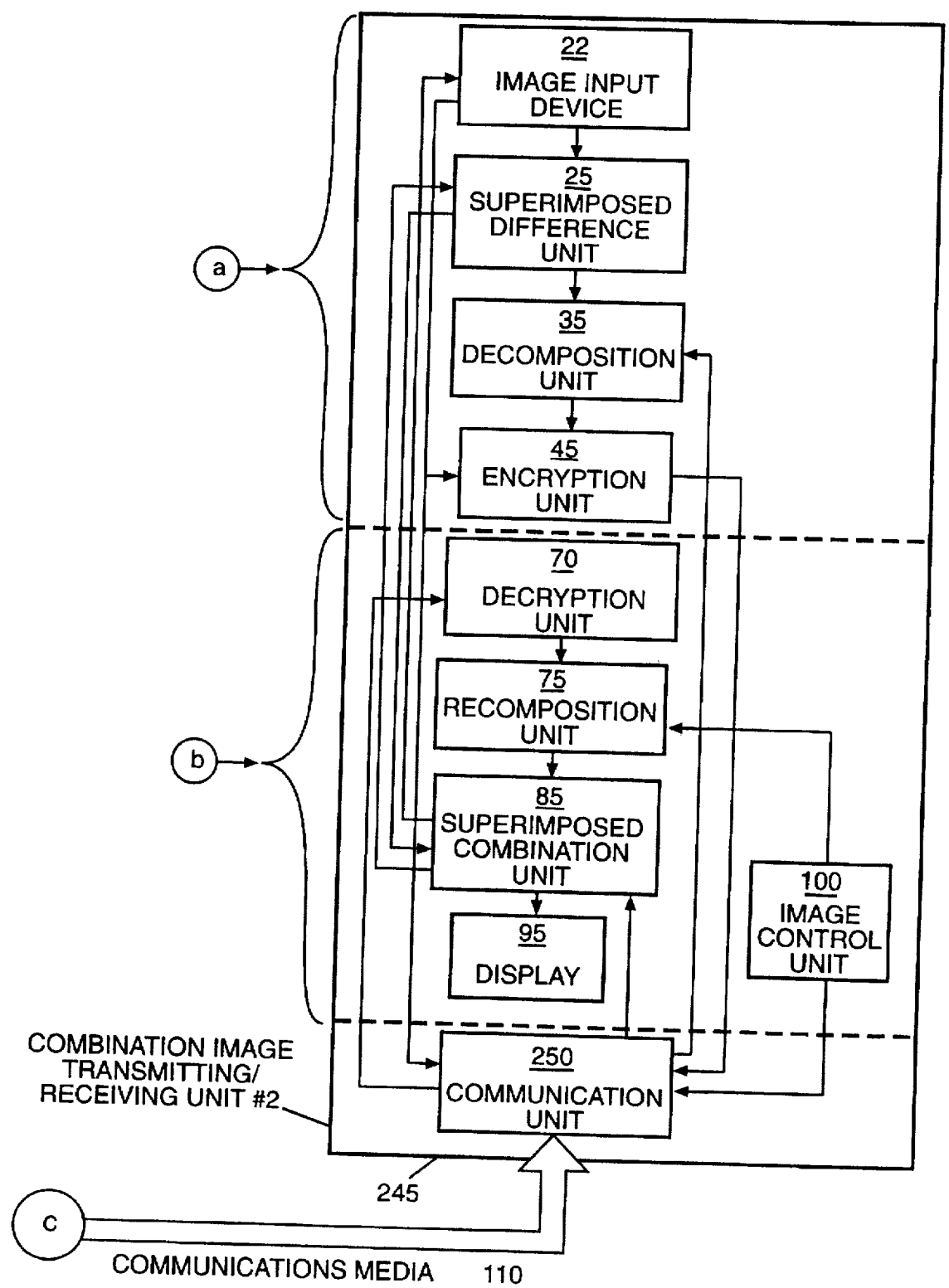

FIG. 6 is a functional block diagram illustrating the combination of an image transmitting unit 20 and an image receiving unit 60 into a single combination image transmitting/receiving unit, generally numbered as 245, capable of both transmitting and receiving multiresolution superimposed image data. Like devices of this type would also be linked by a communications media 110 as previously described. The combination image transmitting/receiving unit 245 is shown in greater detail in FIG. 7. All components are the same as those described individually for the image transmitting unit 20 and the image receiving unit 60 previously described in FIGS. 1 through 5. The only different component is the dual purpose communication unit 250 for the combination image transmitting/receiving unit 245 which includes a single transmitter module 252, a single receiver module 254, and a routing switch 256 added for directing image data collected at the receiver module 252.

Figure 7A:
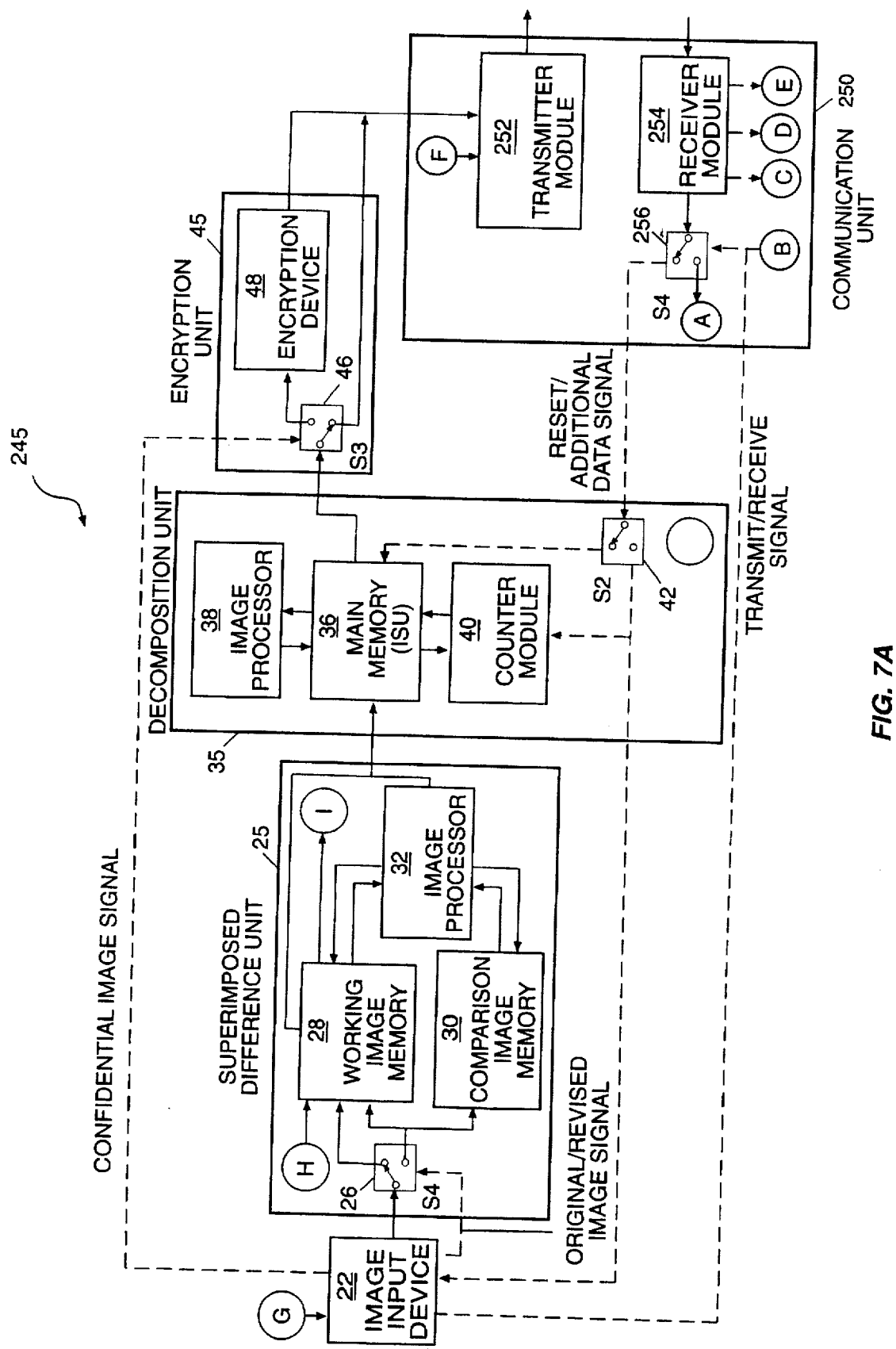
FIG. 7 is a block diagram of a combination image transmitting/receiving unit for both transmission and reception of images in accordance with the methodology of the present invention.
Figure 7B:
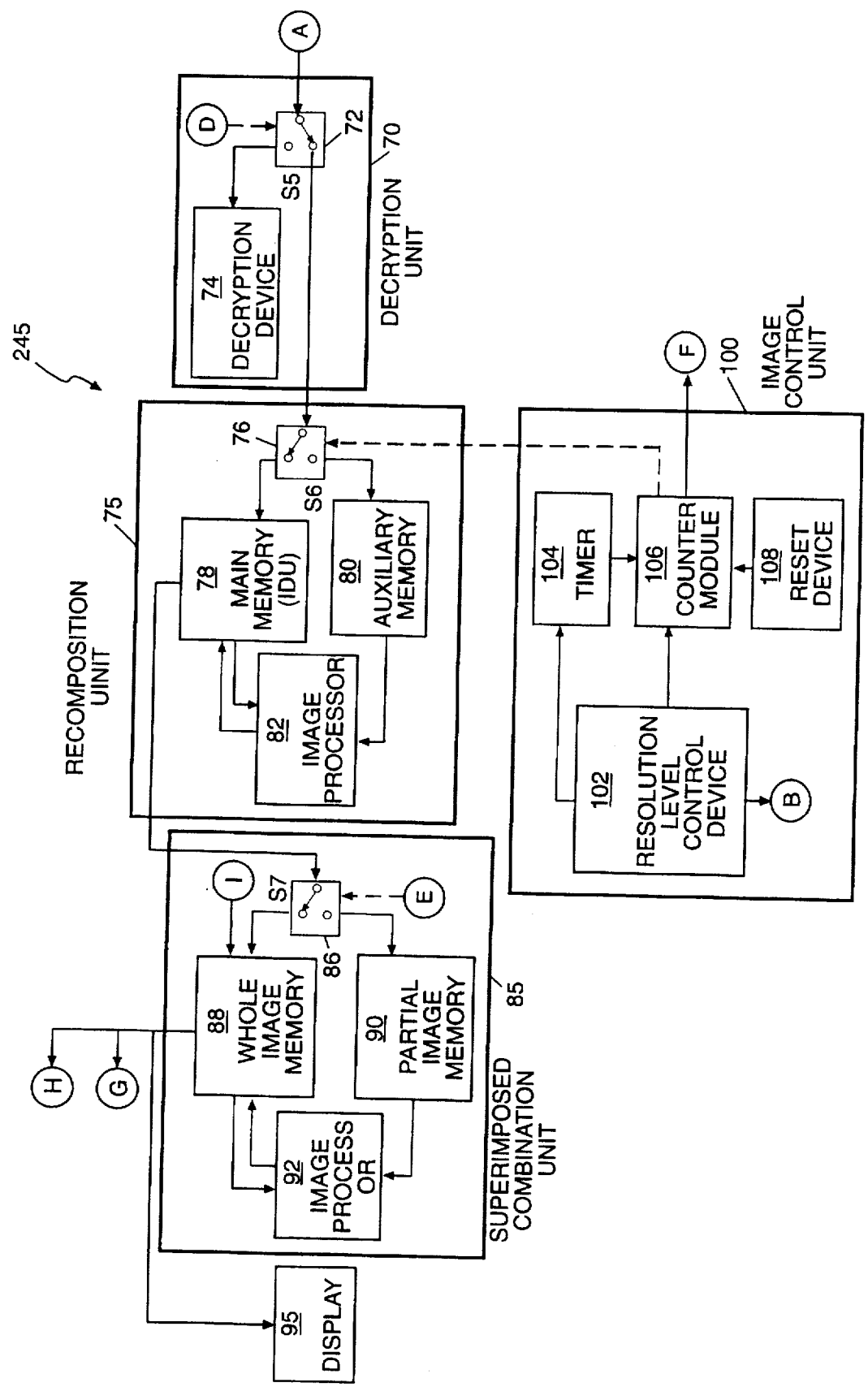
Figure 8A:
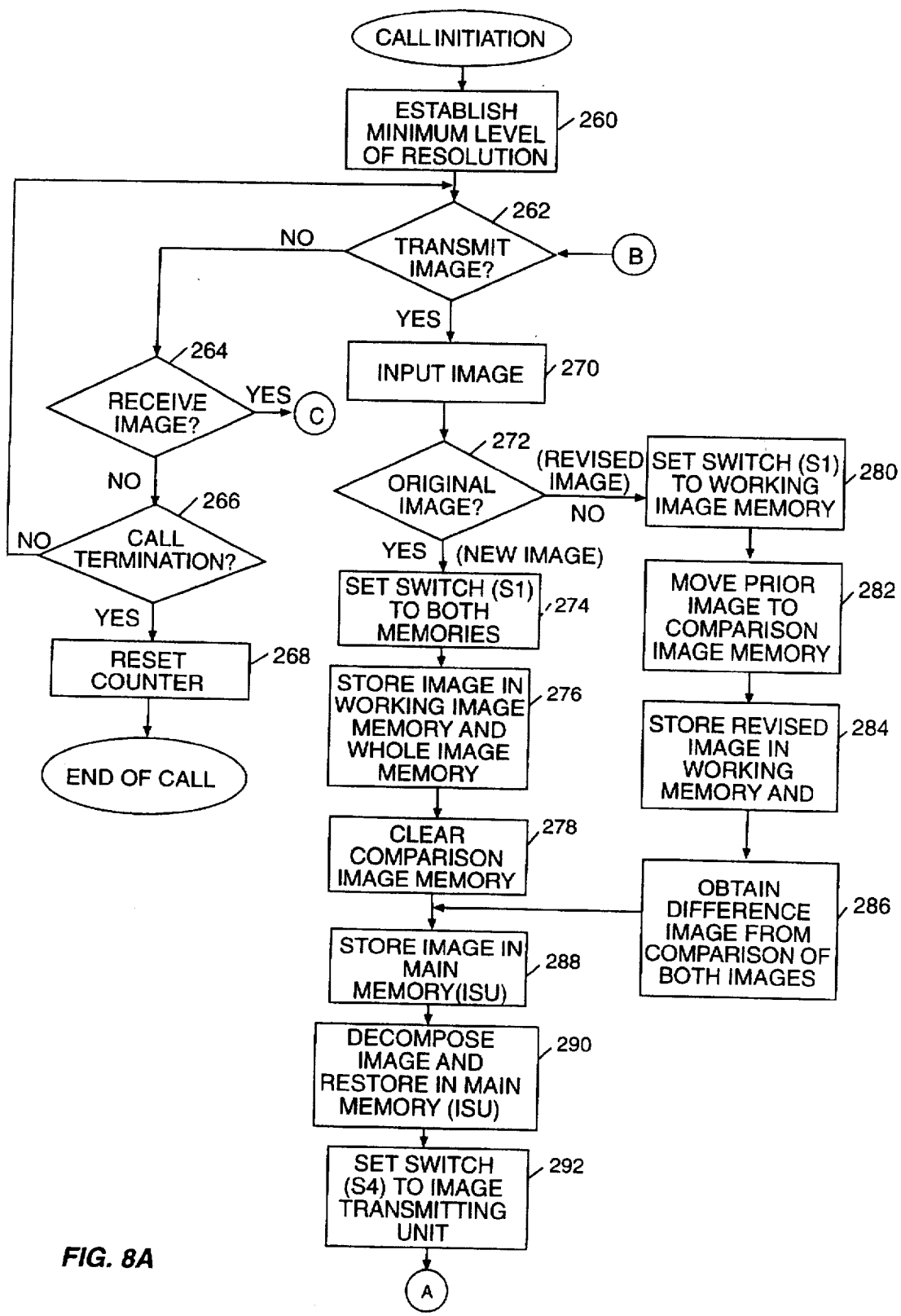
FIG. 8 is a flow diagram illustrating the operation of a combination image transmitting/receiving unit of the present invention.
Figure 8B:
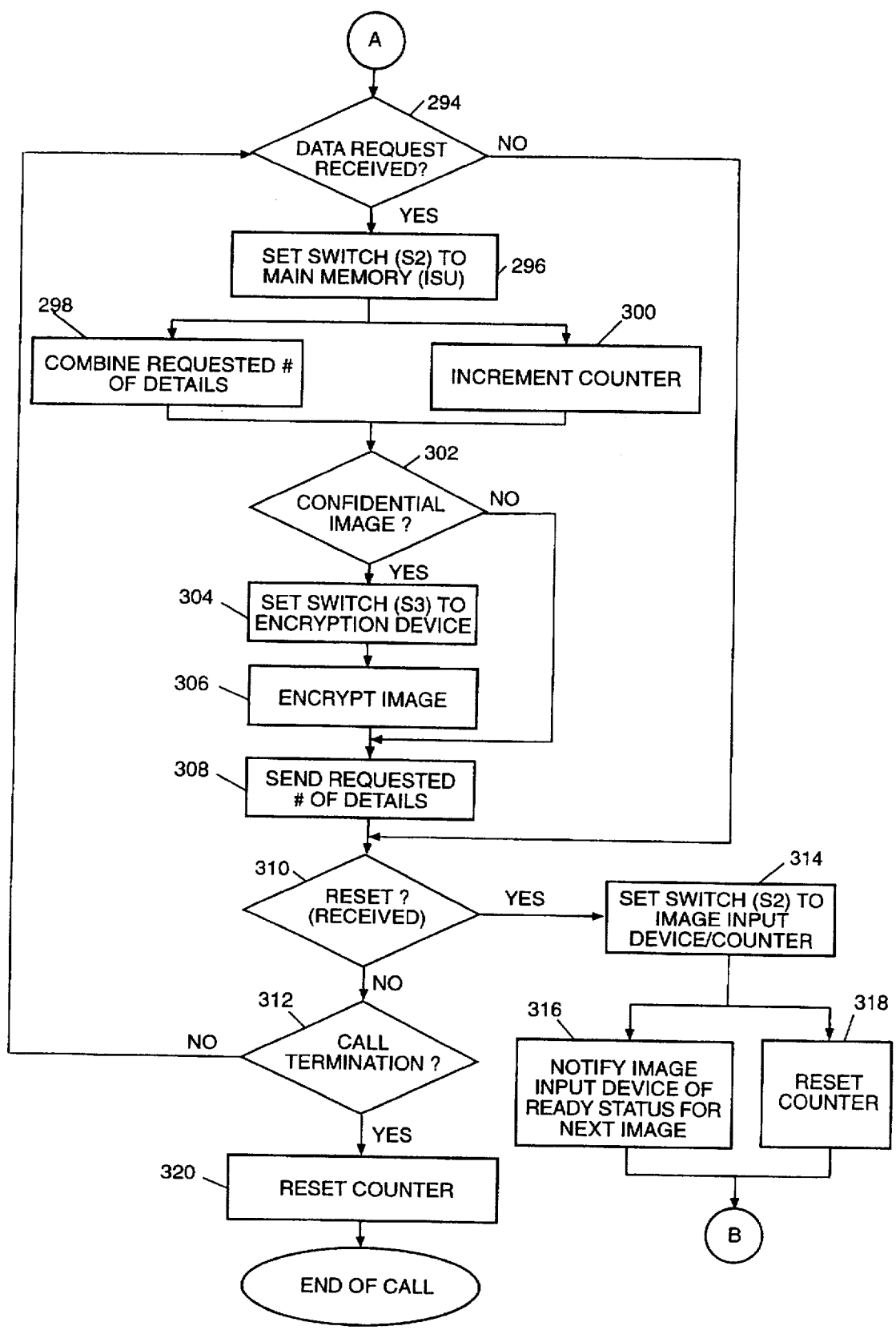
Figure 8C:
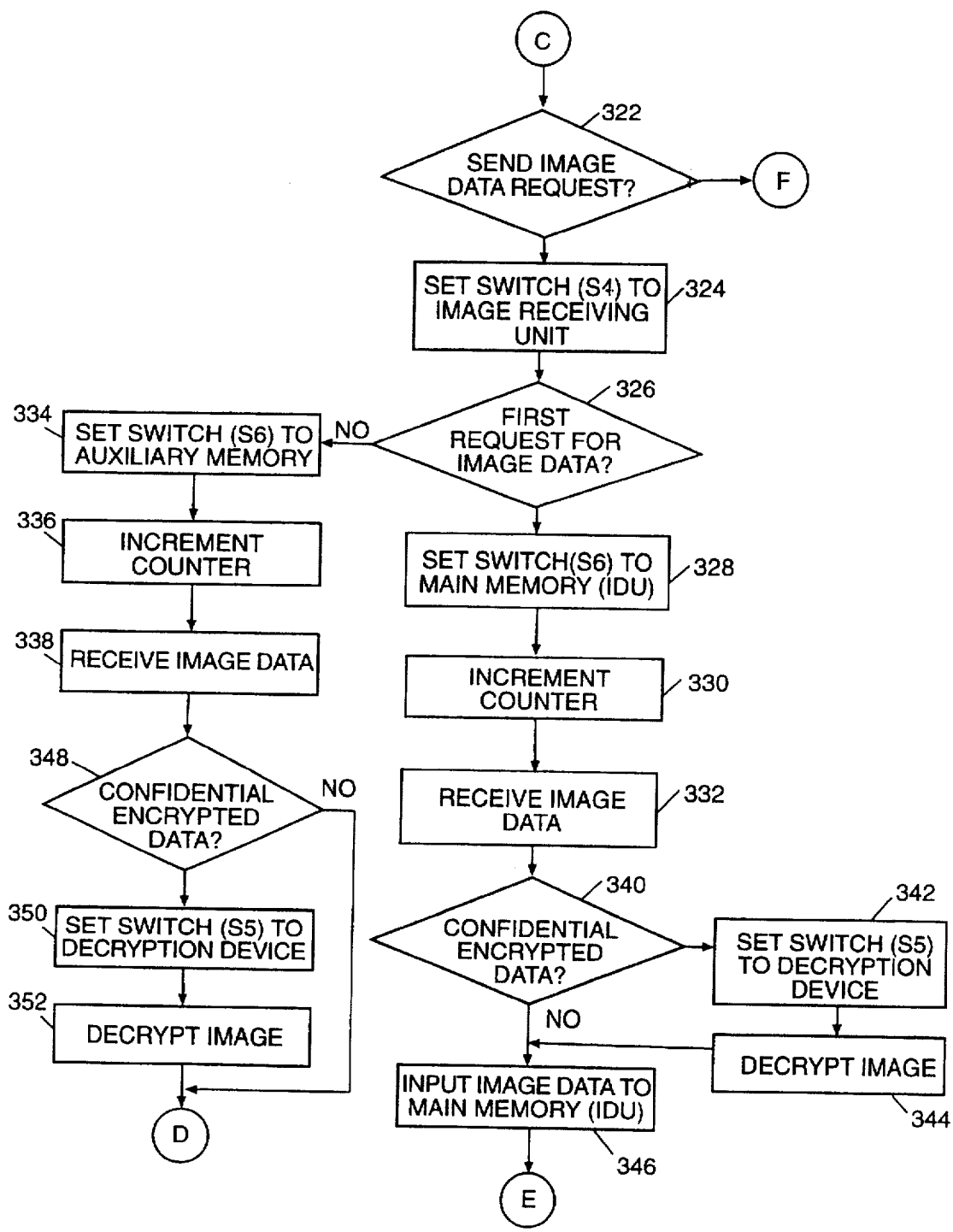
Figure 8D:
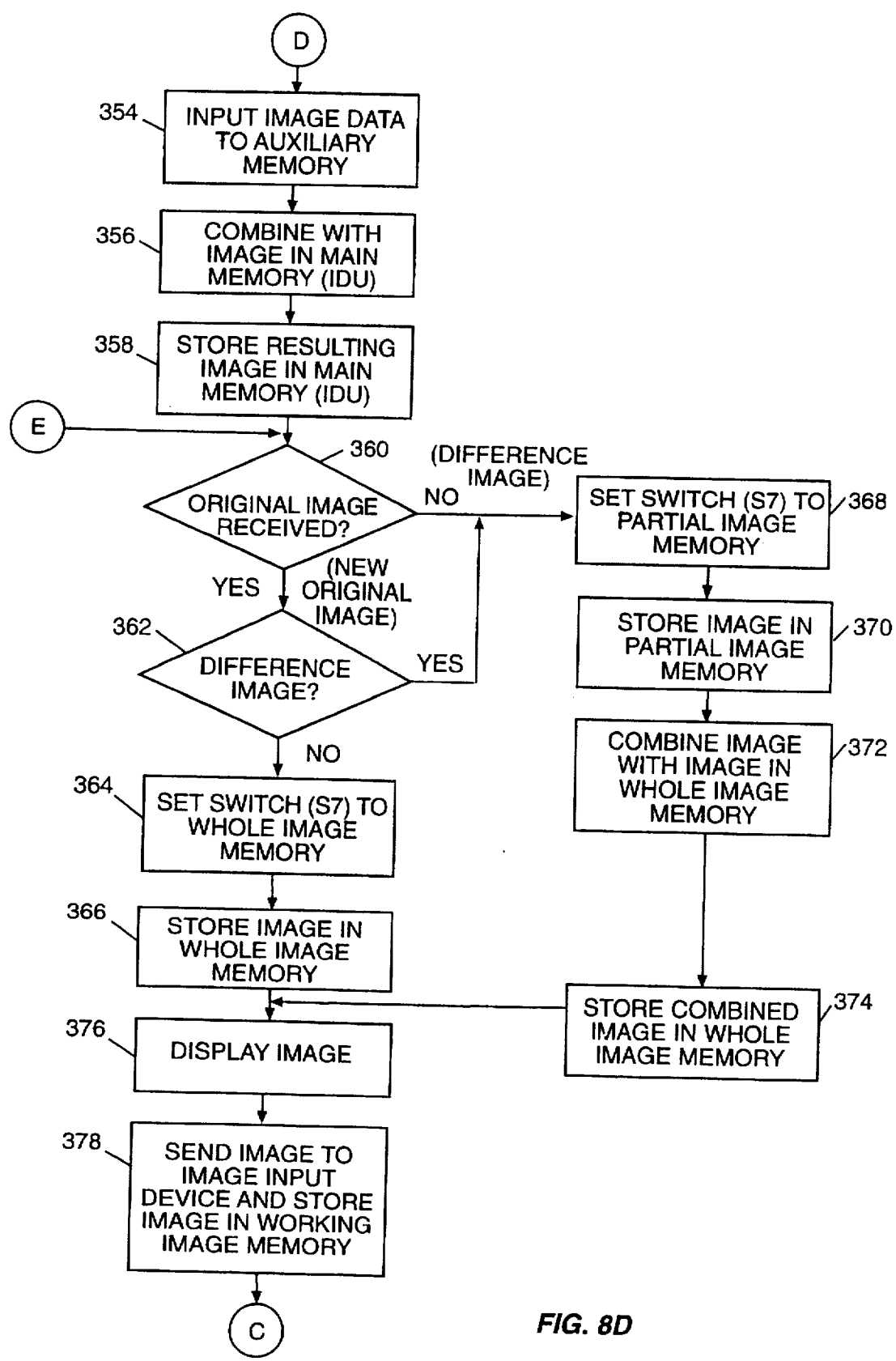
Figure 8E:
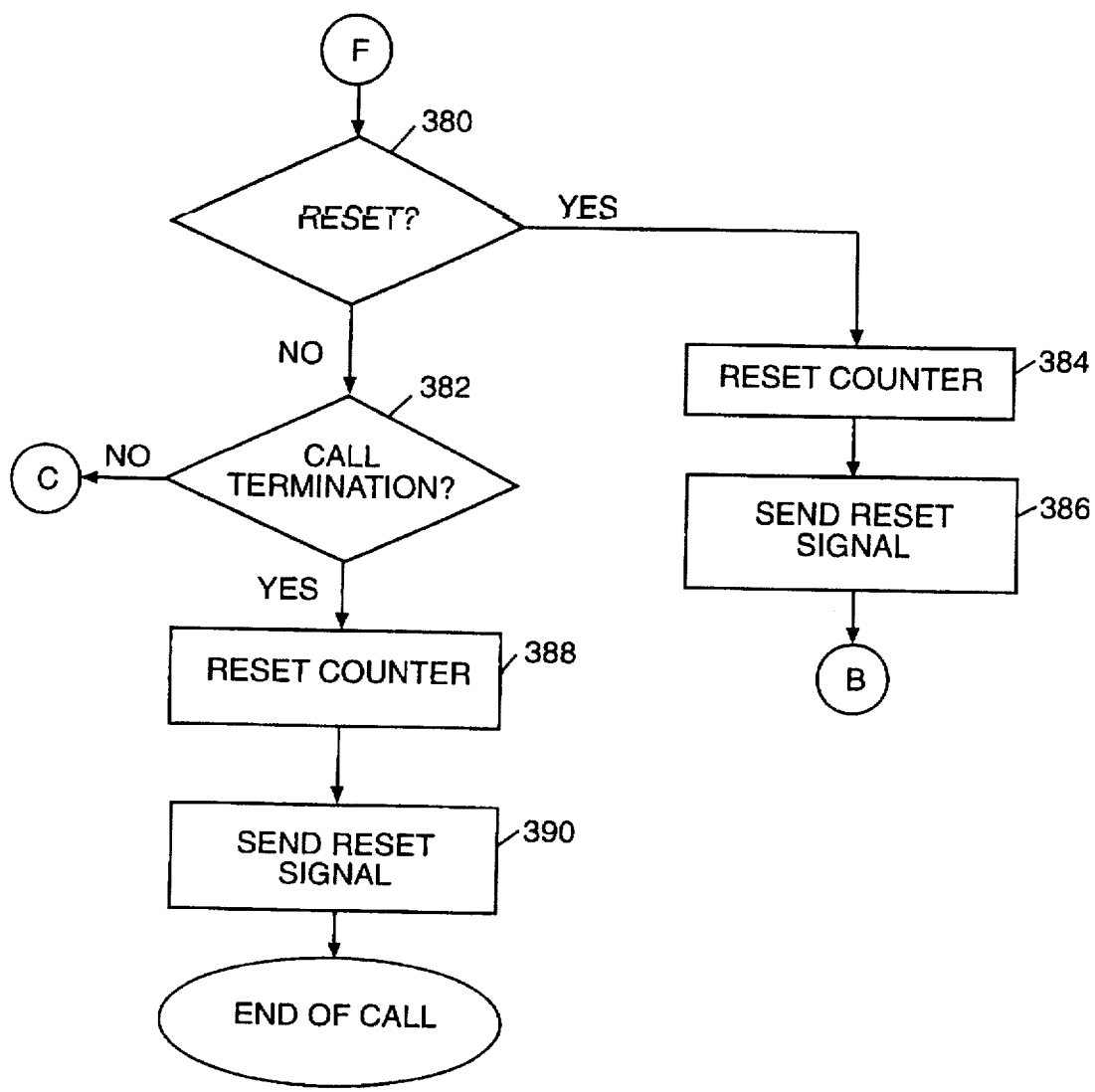

FIG. 8 illustrates the operation of the combination image transmitting/receiving unit 245 of FIGS. 6 and 7 in greater detail. The individual processes for transmitting and receiving images have been previously described above and in FIGS. 4 and 5. The operations of these processes will not be repeated here. Combining an image transmitting unit 20 and an image receiving unit 60 results in some interactions between the two units which were not individually necessary. It is only these features which will be discussed in further detail.

Just as previously described, a call between two like devices is initiated by establishing the minimum level of resolution for any images to be transmitted or received as shown in function block 260. Then, for the combination image transmitting/receiving unit 245, it must then be decided if the unit is to transmit or receive an image (decision blocks 262,264). If the combination image transmitting/receiving unit 245 is to transmit an image (decision block 262), the image input at the image input device 22 is stored in both the working image memory 28 and the whole image memory 88 (decision block 272 and function block 276). If the input image is a revised image (decision block 272), the prior image in the working image memory 28 is first transferred to the comparison image memory 30 through the image processor 32 (function block 282). The revised image is then stored in both the working image memory 28 and the whole image memory 88 (function block 284) and a difference image obtained (function block 286). A parameter defined by the user at the image input device 22 is also necessary to notify routing switch (S4) 256 that any now incoming data through the receiver module 254 is destined to the transmitter section of the combination image transmitting/receiving unit 245.

Otherwise, the decomposition and encryption functions are the same as previously described and, if a reset signal is not received from the receiving party or the call is not terminated, the image data requests from the receiving party will continue to be processed until the maximum level of resolution is reached (starting at decision block 274). After a reset signal has been received, the user is then given a choice of transmitting another image (decision block 262), receiving an image from the other party (decision block 264), or terminating the call (decision block 266).

If another image is to be sent, the process restarts with the image input at function block 272. If no other images are to be transmitted, either the call is terminated (decision block 266) or the system waits to see if the user may decide to send another image or receive an image. Note that if a reset signal is not received in decision block 310, the call may also be terminated (decision block 312). In either instance, the counter module 40 is reset prior to the end of the communication (function blocks 268 and 320).

If the user of the combination image transmitting/receiving unit 245 intends to receive image data (decision block 264), an image data request is sent to the transmitting party by pressing the button 102 (decision block 322). This action will also direct the routing switch (S4) 256 to route image data to the receiver section of the combination image transmitting/receiving unit 245 (function block 324). The receiver section them operates in the same manner as that described in FIG. 5. When the image is finally displayed on the display 95, it is also directed back to the image input device 22 for any revisions which may be made and stored in the working image memory 28 such that it is recognized as an "original" image. If not satisfied with the resolution after reception of the initial base image, the receiving party may increase the resolution by pressing the button 102 as before. This corresponds to the request for additional data as indicated in decision block 322.

The process of incrementally tuning the resolution of the image continues as specified in the preceding paragraph until the receiving party is satisfied or the maximum number of details has been reached. As shown in decision blocks 380 and 382, if a reset signal is not sent by the user or the call is not terminated, respectively, the receiver section will merely display the last image and continue to wait for the user to either request additional details (decision block 322), reset, or terminate the call. If user opts to send a reset signal (decision block 380), the counter module 106 is reset (function block 384) before the reset signal is sent (function block 386). Note that a reset signal may also be effectuated by activating the button 102 more times than the maximum number of details that could be simultaneously requested. Either way, the reset signal is notification to the sending party that the receiver section is ready to receive the next image and the counter module 40 of the sending device is reset. As previously stated, the transmission of a reset signal is also an indicator that the resolution of the previous image is acceptable to the receiving party. From there, the process proceeds back to decision blocks 262 and 264 to await the decision of the user of the combination image transmitting/receiving unit 245. If another image is to be received, the process restarts with the activation of the button 102 which sends an image data request. If no other images are requested and the reset button is not reactivated, the call is terminated (decision block 382). In this instance, the counter module 106 is reset (function block 388) and a final reset signal transmitted to the other party to the communication (function block 390) prior to the end of the call.

The described method for transmitting multiresolution image data for superimposed images illustrates the increased level of efficiency which may be realized by enabling the parties to the communication to determine the optimal level of resolution required when superimposed images are communicated. The interactive nature of this method also permits the parties to optimize the resolution of each image transmitted in a multi-image sequence. Thus, this method would result in significantly faster transmission of images, especially if the highest level of resolution is not required for the user's needs. In addition, a single image could comprise different components each at a different resolution. Therefore, when applied to radio frequency communications, this method would serve to increase the efficiency of image communication by reducing memory requirements, bandwidth requirements, power consumption, and air time.

The present invention may, of course, be carried out in other specific ways than those herein set forth without parting from the spirit and essential character of the invention. The present embodiments are, therefore, to be considered in all respects as illustrative and not restrictive, and all changes coming within the meaning and equivalency range of the appended Claims are intended to be embraced therein.

What is claimed is:

1. A method for transmitting superimposed image data via wireless devices in a radio frequency communication system, comprising the steps of:
   a) storing an original image in an image transmitting unit;
   b) transmitting the original image from the image transmitting unit to an image receiving unit;
   c) storing the original image in the image receiving unit;
   d) revising the original image in the image transmitting unit to form a revised image;
   e) storing the revised image in the image transmitting unit;
   f) comparing and determining the differences between the revised image and the original image;
   g) forming a difference image comprising the differences between the revised image and the original image;
   h) transmitting the difference image to the image receiving unit;
   i) adding the difference image to the original image to recreate the revised image at the image receiving unit; and
   j) storing the revised image in the image receiving unit.

2. The method according to claim 1 wherein the original image and subsequent revised images are stored in a working image memory in the image transmitting unit.

3. The method according to claim 2 further including the step of transferring the last image in the working image memory to a comparison image memory in the image transmitting unit when a subsequent revised image is stored in the working image memory.

4. The method according to claim 3 wherein an image processor in the image transmitting unit compares the image in the working image memory with the image in the comparison image memory and determines the differences between the images to form a difference image.

5. The method according to claim 1 wherein the original image and subsequent revised images are stored in a whole image memory in the image receiving unit.

6. The method according to claim 5 wherein the difference image is stored in a partial image memory in the image receiving unit.

7. The method according to claim 6 wherein an image processor in the image receiving unit recombines the image in the whole image memory with the image in the partial image memory to recreate the revised image.

8. The method according to claim 7 wherein the revised image is stored in the whole image memory of the image receiving unit.

9. The method of claim 8 wherein the image in the whole image memory is displayed at the image receiving unit.

10. The method of claim 1 wherein the step of transmitting the original image comprises decomposing the original image into a base image and one or more image details; storing the decomposed original image in an image transmitting unit; transmitting the base image from an image transmitting unit to an image receiving unit; receiving one or more additional data requests from the image receiving unit; and transmitting additional image details from the image transmitting unit to the image receiving unit in response to the additional image data requests.

11. The method according to claim 10 wherein the step of transmitting additional image data requests comprises sending a multiple image data request for multiple image details.

12. The method according to claim 11 wherein the step of transmitting additional image details includes transmitting multiple image details in response to a multiple image data request.

13. The method according to claim 12 wherein the step of transmitting multiple image details includes combining the multiple image details prior to transmission to the image receiving unit.

14. The method according to claim 12 wherein the step of transmitting multiple image details includes transmitting the image details in a string of discrete information blocks.

15. The method according to claim 10 including the step of storing, at the image transmitting unit, a count of the total number of image details transmitted to the image receiving unit.

16. The method according to claim 15 wherein the step of transmitting the additional image details includes determining the total number of image details previously transmitted to the image receiving unit, transmitting the next image details, and incrementing the total count.

17. A method for transmitting a superimposed image between an image transmitting unit and an image receiving unit, comprising the steps of:

a) decomposing an original image into discrete information blocks including a base image information block and one or more image detail information blocks;

b) storing the information blocks in the image transmitting unit;

c) sending a first image data request from an image receiving unit to the image transmitting unit;

d) transmitting an information block containing the base image from the image transmitting unit to the image receiving unit in response to the first image data request;

e) displaying the base image at the image receiving unit;

f) sending one or more additional image data requests from the image receiving unit to the image transmitting unit;

g) transmitting additional information blocks containing image details from the image transmitting unit to the image receiving unit in response to the additional image data requests;

h) combining, at the image receiving unit, the image details with the base image and any previous image details received by the image receiving unit to create a new detail image of higher resolution than the previous image;

i) displaying the new detail image at the image receiving unit;

j) revising the original image at the image transmitting unit to form a revised image;

k) comparing the revised image to the original image and extracting the differences between the images to form a difference image;

l) transmitting the difference image from the image transmitting unit to the image receiving unit;

m) recombining the original image with the difference image at the image receiving unit to reform the revised image; and n) displaying the revised image at the image receiving unit.

18. The method according to claim 17 wherein the original image and subsequent revised images are stored in a working image memory in the image transmitting unit.

19. The method according to claim 18 further including the step of transferring the last image in the working image memory to a comparison image memory in the image transmitting unit when a subsequent revised image is stored in the working image memory.

20. The method according to claim 19 wherein an image processor in the image transmitting unit compares the image in the working image memory with the image in the comparison image memory and determines the differences between the images to form a difference image.

21. The method according to claim 17 wherein the original image is stored in a whole image memory of the image receiving unit.

22. The method according to claim 21 wherein subsequent difference images are stored in a partial image memory of the image receiving unit.

23. The method according to claim 22 wherein an image processor in the image receiving unit combines the difference image in the partial image memory with the previous iteration of the image in the whole image memory to create a new, revised image and stores the new, revised image in the whole image memory.

24. The method according to claim 23 wherein the revised image is displayed at the image receiving unit.

25. The method according to claim 17 wherein the step of transmitting additional image data requests comprises sending a multiple image data request for multiple image details.

26. The method according to claim 25 wherein the step of transmitting additional image details includes transmitting multiple image details in response to a multiple image data request.

27. The method according to claim 26 wherein the step of transmitting multiple image details includes combining the multiple image details prior to transmission to the image receiving unit.

28. The method according to claim 27 wherein the step of transmitting multiple image details includes transmitting the image details in a string of discrete information blocks.

29. The method according to claim 17 including the step of storing, at the image transmitting unit, a count of the total number of image details transmitted to the image receiving unit.

30. The method according to claim 29 wherein the step of transmitting the additional image details includes determining the total number of image details previously transmitted to the image receiving unit, transmitting the next image details, and incrementing the total count.

31. A superimposed image data transmission system, comprising:

a) an image transmitting unit having a memory for storing an original image and a subsequent revision of the original image;

b) an image processing means in the image transmitting unit for comparing the original image with the revised image and forming a difference image comprising the differences between the revised image and the original image;

c) an image receiving unit including an image display;

d) a communication means linking the image transmitting unit with the image receiving unit for transmitting the original image and the difference images to the image receiving unit; and e) image processing means in the image receiving unit for combining the difference image with original image to reform the revised image.

32. The superimposed image data transmission system of claim 31 further including an image decomposition unit in the image transmitting unit for decomposing images prior to transmission to the image receiving unit.

33. The superimposed image data transmission system of claim 32 wherein the image receiving unit includes means for recombining images which are decomposed prior to transmission.

34. A multiresolution transmission system for superimposed image data, comprising:

a) an image transmitting unit having memory for storing an original image and a subsequent revised image;

b) an image comparison means in the image transmitting unit for comparing the original image with the subsequent revised image and creating a difference image comprising the differences between the original image and the revised image;

c) an image transmitting unit having memory for storing a decomposed image in information blocks;

d) an image decomposition means for decomposing an image into a base image and one or more image details which are sequentially combined with the base image to create details images of increasingly higher resolution;

e) an image receiving unit including an image display;

f) communication means linking the image transmitting unit with the image receiving unit;

g) request means for sending image data requests from the image receiving unit to the image transmitting unit, with the image transmitting unit being responsive to the image data requests to send image data to the image receiving unit in discrete units beginning with the base image and progressing incrementally through the image details until the last image detail as reached;

h) an image processing means in the image receiving unit for combining the base image with the image details to create detail images of increasingly higher resolution with the addition of each image detail;

i) a reset means in the image receiving unit for terminating an image transmission sequence and notifying the image transmitting unit of a ready status for receiving another image; and j) an image processing means in the image receiving unit for combining the difference image with original image to recreate the revised image.

\* \* \* \* \*